(12) United States Patent
Shimizu et al.

(10) Patent No.: US 9,121,361 B2
(45) Date of Patent: Sep. 1, 2015

(54) CONTROL SYSTEM OF ELECTRIC ACTUATOR AND CONTROL METHOD THEREOF

(75) Inventors: Hirokazu Shimizu, Isesaki (JP); Kenichi Machida, Isesaki (JP)

(73) Assignee: HITACHI, LTD., Tokyo (JP)

( * ) Notice: Subject to any disclaimer, the term of this patent is extended or adjusted under 35 U.S.C. 154(b) by 692 days.

(21) Appl. No.: 12/208,674

(22) Filed: Sep. 11, 2008

(65) Prior Publication Data

US 2009/0088892 A1 Apr. 2, 2009

(30) Foreign Application Priority Data

Oct. 1, 2007 (JP) ................................. 2007-258124

(51) Int. Cl.
*G01M 17/00* (2006.01)
*F02D 41/22* (2006.01)
(Continued)

(52) U.S. Cl.
CPC ........... *F02D 41/221* (2013.01); *F01L 13/0026* (2013.01); *F02D 41/266* (2013.01); *G05B 9/03* (2013.01); *G06F 11/1633* (2013.01); *B60L 3/0092* (2013.01); *F01L 1/0532* (2013.01); *F01L 1/143* (2013.01); *F01L 2001/0537* (2013.01); *F01L 2013/0073* (2013.01); *F01L 2800/00* (2013.01); *F01L 2800/11* (2013.01); *F01L 2820/032* (2013.01); *F02D 41/009* (2013.01); *F02D 2041/001* (2013.01);
(Continued)

(58) Field of Classification Search
CPC .... G05B 9/03; G05B 19/0428; G05B 19/048; G05B 2219/24054; G05B 2219/2637; G06F 11/3082; G06F 11/3006; G06F 11/3013; G06F 11/1633; G06F 11/1637; B62D 5/0493; B60T 8/885; F01L 13/00; F01L 1/34; F01L 13/0026; F02D 41/221; F02D 41/266
USPC .............. 700/213, 20, 21, 26, 79, 81; 701/36, 701/29.1, 29.2, 29.7, 30.3, 30.5, 30.6, 31.7, 701/33.7, 34.3, 34.4, 39, 43, 76, 92, 97, 701/107, 114, 29.9, 31, 41, 34; 180/446; 714/11, 820; 361/23, 160
See application file for complete search history.

(56) References Cited

U.S. PATENT DOCUMENTS 3,680,069 A * 7/1972 Neumann et al. ................ 714/46
4,412,280 A * 10/1983 Murphy et al. .................. 714/10
(Continued)

FOREIGN PATENT DOCUMENTS

| JP | 08-093518 | * | 4/1996 | .............. F02D 29/02 |
| JP | 08-303287 | * | 11/1996 | .............. F02D 41/22 |

(Continued)

*Primary Examiner* — Thomas G Black
*Assistant Examiner* — Sze-Hon Kong
(74) *Attorney, Agent, or Firm* — Foley & Lardner LLP

(57) ABSTRACT

In an aspect of the present invention, each of plural control units which controls drive of an electric actuator diagnoses existence of abnormality in drive control of the electric actuator, the abnormality differing from control unit to control unit; the control unit transmits diagnostic result thereof to another control unit; the control unit outputs an abnormal determination signal as a signal indicating diagnostic result therefrom when at least one of the diagnostic result thereof and the diagnostic result of another control unit indicates abnormality; and the control unit transfers the drive control of the electric actuator to an abnormal use control state when the abnormal determination signal is output from at least one of the plural control units.

17 Claims, 25 Drawing Sheets

(51) Int. Cl.

| | | |
|---|---|---|
| *G06F 11/16* | (2006.01) | |
| *G05B 9/03* | (2006.01) | |
| *F01L 13/00* | (2006.01) | |
| *F02D 41/26* | (2006.01) | |
| *G05B 19/042* | (2006.01) | |
| *G05B 19/048* | (2006.01) | |
| *B60L 3/00* | (2006.01) | |
| *F01L 1/053* | (2006.01) | |
| *F01L 1/14* | (2006.01) | |
| *F02D 41/00* | (2006.01) | |

(52) U.S. Cl.
CPC .......... *F02D 2400/08* (2013.01); *G05B 19/048* (2013.01); *G05B 19/0428* (2013.01)

(56) References Cited

U.S. PATENT DOCUMENTS

| | | | | |
|---|---|---|---|---|
| 4,517,639 | A * | 5/1985 | Ferrell et al. | 700/81 |
| 4,667,284 | A * | 5/1987 | Asami | 700/82 |
| 4,745,542 | A * | 5/1988 | Baba et al. | 700/79 |
| 5,084,878 | A * | 1/1992 | Kanekawa et al. | 714/797 |
| 5,152,585 | A * | 10/1992 | Patient et al. | 303/10 |
| 5,163,052 | A * | 11/1992 | Evans et al. | 714/31 |
| 5,339,408 | A * | 8/1994 | Bruckert et al. | 714/11 |
| 5,586,156 | A * | 12/1996 | Gaubatz | 376/216 |
| 5,689,170 | A * | 11/1997 | Ishikawa | 318/811 |
| 5,739,761 | A * | 4/1998 | Kobayashi | 701/29.2 |
| 5,771,861 | A * | 6/1998 | Musser et al. | 123/357 |
| 5,805,797 | A * | 9/1998 | Sato et al. | 714/48 |
| 5,812,757 | A * | 9/1998 | Okamoto et al. | 714/11 |
| 5,898,829 | A * | 4/1999 | Morikawa | 714/47.1 |
| 5,927,251 | A * | 7/1999 | Watanabe et al. | 123/399 |
| 5,966,305 | A * | 10/1999 | Watari et al. | 700/82 |
| 5,980,081 | A * | 11/1999 | Watari et al. | 700/79 |
| 6,038,683 | A * | 3/2000 | Shimamura et al. | 714/11 |
| 6,109,239 | A * | 8/2000 | Watanabe | 123/396 |
| 6,178,947 | B1 * | 1/2001 | Machida et al. | 123/396 |
| 6,373,217 | B1 * | 4/2002 | Kawada et al. | 318/564 |
| 6,450,145 | B2 * | 9/2002 | Machida et al. | 123/396 |
| 6,550,018 | B1 * | 4/2003 | Abonamah et al. | 714/6.32 |
| 6,704,628 | B1 * | 3/2004 | Fennel et al. | 701/33.7 |
| 6,718,254 | B2 * | 4/2004 | Hashimoto et al. | 701/110 |
| 6,732,300 | B1 * | 5/2004 | Freydel | 714/36 |
| 6,775,609 | B2 * | 8/2004 | Ozeki et al. | 701/114 |
| 6,805,094 | B2 * | 10/2004 | Hashimoto et al. | 123/396 |
| 6,892,129 | B2 | 5/2005 | Miyano | |
| 7,047,440 | B1 * | 5/2006 | Freydel et al. | 714/11 |
| 7,765,041 | B2 | 7/2010 | Tatsumi et al. | |
| 7,826,962 | B2 * | 11/2010 | Ushijima et al. | 701/114 |
| 8,099,179 | B2 * | 1/2012 | Naik et al. | 700/21 |
| 2001/0027537 | A1 * | 10/2001 | Nada et al. | 714/23 |
| 2002/0193935 | A1 * | 12/2002 | Hashimoto et al. | 701/110 |
| 2003/0144778 | A1 * | 7/2003 | Miyano | 701/29 |
| 2004/0034810 | A1 * | 2/2004 | Heckmann et al. | 714/11 |
| 2004/0199824 | A1 * | 10/2004 | Harter | 714/30 |
| 2005/0174717 | A1 * | 8/2005 | Machida et al. | 361/160 |
| 2005/0288843 | A1 * | 12/2005 | Lindqvist | 701/70 |
| 2006/0042858 | A1 * | 3/2006 | Boyle et al. | 180/402 |
| 2007/0192001 | A1 * | 8/2007 | Tatsumi et al. | 701/29 |
| 2008/0258548 | A1 * | 10/2008 | May et al. | 303/139 |

FOREIGN PATENT DOCUMENTS

| | | |
|---|---|---|
| JP | 2003-167601 A | 6/2003 |
| JP | 2003-214233 A | 7/2003 |
| JP | 2005-224068 A | 8/2005 |
| JP | 2007-191098 A | 8/2007 |

* cited by examiner

CONTROL SYSTEM OF ELECTRIC ACTUATOR AND CONTROL METHOD THEREOF

BACKGROUND OF THE INVENTION

1. Field of the Invention

The present invention relates to a control system of an electric actuator and a control method thereof, in which drive of the electric actuator is controlled by a plurality of controlling units.

2. Description of the Related Art

Japanese Laid-open (Kokai) Patent Application Publication No. 2005-224068 discloses a control system including a VEL controller and an engine control module (ECM). The VEL controller controls an electric actuator (motor) for driving a Variable Valve Mechanism (VEL mechanism) in which Valve lift amounts and valve operating angle of inlet and exhaust valves of an engine are variable. The engine control module controls each device of the engine. In the control system, the ECM computes a target valve lift amount to output the target valve lift amount to the VEL controller, and the ECM diagnoses control abnormality of the VEL controller to input a signal indicating the diagnostic result and an output signal from the VEL controller into an AND circuit. When both the signals input into the AND circuit correspond to a normal state, an electric power is supplied to a drive circuit of the electric actuator. When at least one of the signals input into the AND circuit indicates abnormality, the electric power supplied to the drive circuit is cut off.

In the control system as disclosed above, the electric power supplied to the drive circuit is cut off when at least one of the signals input into the AND circuit indicates abnormality, so that a mistaken control of the electric actuator can be prevented. However, when a circuit which outputs the signal to the AND circuit breaks down to maintain a signal indicating the normal state, sometimes the electric power supplied to the drive circuit cannot forcedly be cut off although the abnormal diagnosis is made.

SUMMARY OF THE INVENTION

Therefore, in view of the above conventional problems, the present invention has an object to surely implement a transition to a fail-safe state of the electric actuator controlling, even if a failure which cannot lead the electric actuator controlling to the fail-safe state on the basis of the diagnostic result by one of a plurality of control units, is generated.

In order to achieve the above objects, each of the plurality of control units has a function of diagnosing existence of abnormality in drive control of the electric actuator, sends diagnostic result of the own control unit to another control unit, outputs an abnormal determination signal as a signal indicating the diagnostic result when at least one of the diagnostic result of the own control unit and the diagnostic result of another control unit indicates abnormality, and transfers the drive control of the electric actuator to an abnormal use control state when the abnormal determination signal is output from at least one of the plurality of control units.

The other objects and features of this invention will become understood from the following description with reference to the accompanying drawing.

DESCRIPTION OF PREFERRED EMBODIMENTS

Exemplary embodiments of the invention will be described below.

Figure 1:
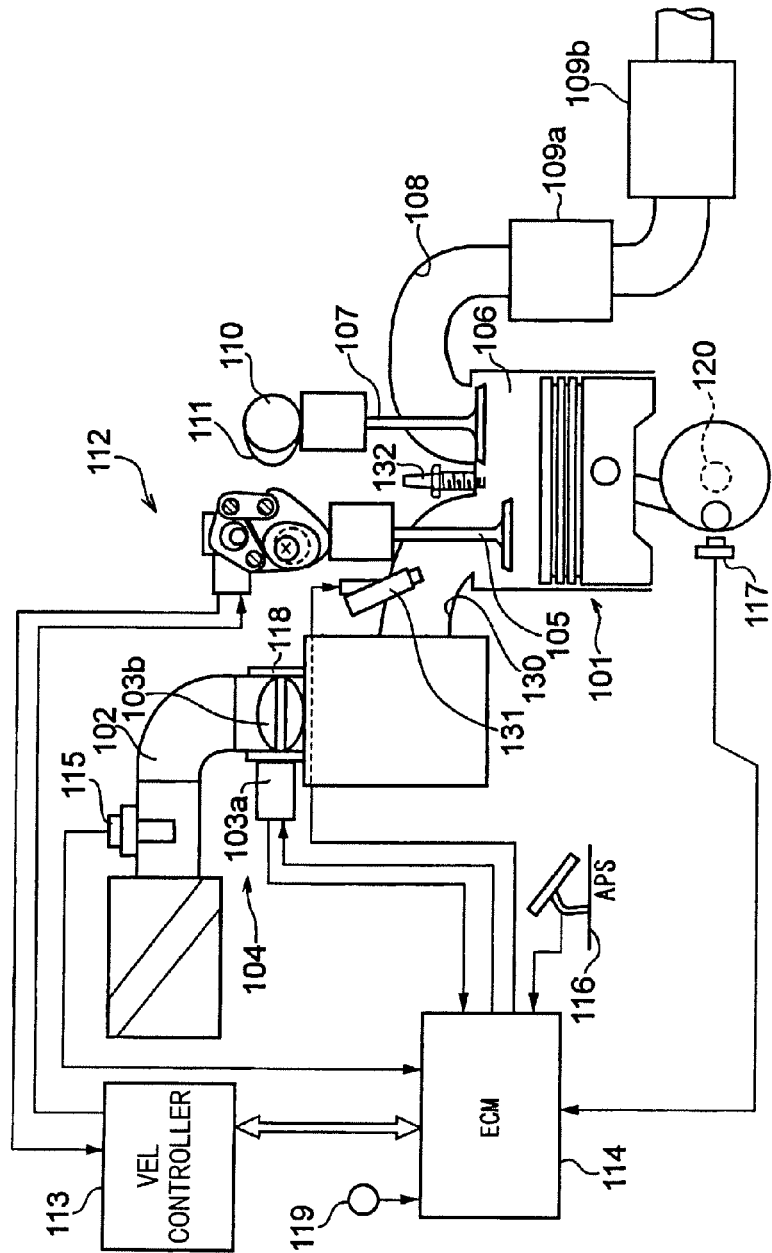
FIG. 1 is a schematic view illustrating an engine according to an embodiment of the present invention.

FIG. 1 is a schematic view showing a vehicle engine including a control system for an electric actuator according to an embodiment of the present invention. In FIG. 1, an output of an engine 101 is transmitted to a drive wheel of a vehicle through a transmission (not shown).

An electronically controlled throttle 104 is disposed on an inlet pipe 102 of engine 101. In electronically controlled throttle 104, a throttle motor 103a drives opening and closing of a throttle valve 103b. Air is taken into a combustion chamber 106 through electronically controlled throttle 104 and an inlet valve 105.

A combustion exhaust gas from each cylinder is exhausted from combustion chamber 106 to an exhaust pipe 108 through an exhaust valve 107, and the combustion exhaust gas is discharged into the atmosphere after purified by a front catalyst converter 109a and a rear catalyst converter 109b which are inserted in exhaust pipe 108.

Exhaust valve 107 is driven to open or close using a cam 111 journaled in an exhaust-side cam shaft 110 while a maximum valve lift amount, a valve operation angle, and valve timing are kept constant.

On the other hand, in inlet valve 105, the maximum valve lift amount and the valve operation angle are continuously variable by a variable lift mechanism (VEL mechanism) 112.

A VEL controller 113 is provided to be able to intercommunicate with an engine control module (ECM) 114, ECM 114 which is of a first control unit computes a target maximum valve lift amount of inlet valve 105 according to an operating condition, and ECM 114 sends the target maximum valve lift amount to VEL controller 113 which is of a second control unit.

When VEL controller 113 receives the target maximum valve lift amount, VEL controller 113 performs feedback control of variable lift mechanism 112 such that an actual maximum valve lift amount is brought close to the target maximum valve lift amount.

Both ECM 114 and VEL controller 113 include microcomputers.

Various detection signals are input into ECM 114 from an air flow sensor 115, an accelerator pedal sensor 116, a crank angle sensor 117, a throttle sensor 118, and a water temperature sensor 119. Air flow sensor 115 detects an intake air amount of engine 101. Accelerator pedal sensor 116 detects an accelerator opening corresponding to depression amount of an accelerator pedal operated by a driver of the vehicle. Crank angle sensor 117 detects a crank rotational signal from a crank shaft 120. Throttle sensor 118 detects an opening TVO of throttle valve 103b. Water temperature sensor 119 detects a cooling water temperature of engine 101.

A fuel injection valve 131 is provided in an inlet port 130 on an upstream side of inlet valve 105 of each cylinder. The fuel injection valve 131 may be used in a direct-injection engine in which fuel is directly injected into combustion chamber 106.

ECM 114 computes a fuel injection pulse width (fuel injection mount) on the basis of various detection signals, and outputs an injection pulse signal of the pulse width to fuel injection valve 131. Then, ECM 114 causes fuel injection valve 131 to inject the fuel proportional to the pulse width to control the fuel supply to engine 101.

Further, ECM 114 computes ignition timing (ignition timing advanced angle) on the basis of the fuel injection pulse width (engine load) and a rotation speed of the engine to control the ignition timing of an ignition plug 132.

Figure 2:
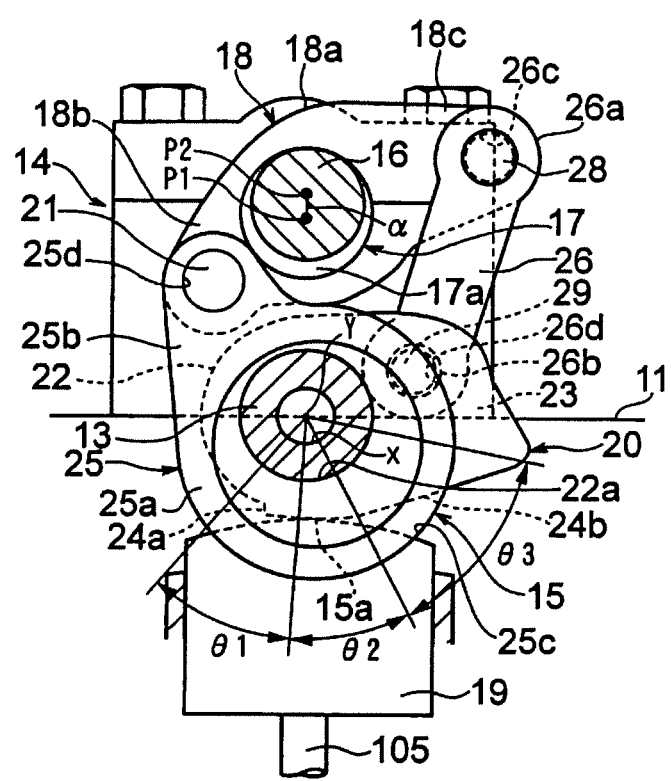
FIG. 2 is a sectional view illustrating a variable lift mechanism (sectional view taken on a line A-A of FIG. 3)
Figure 3:
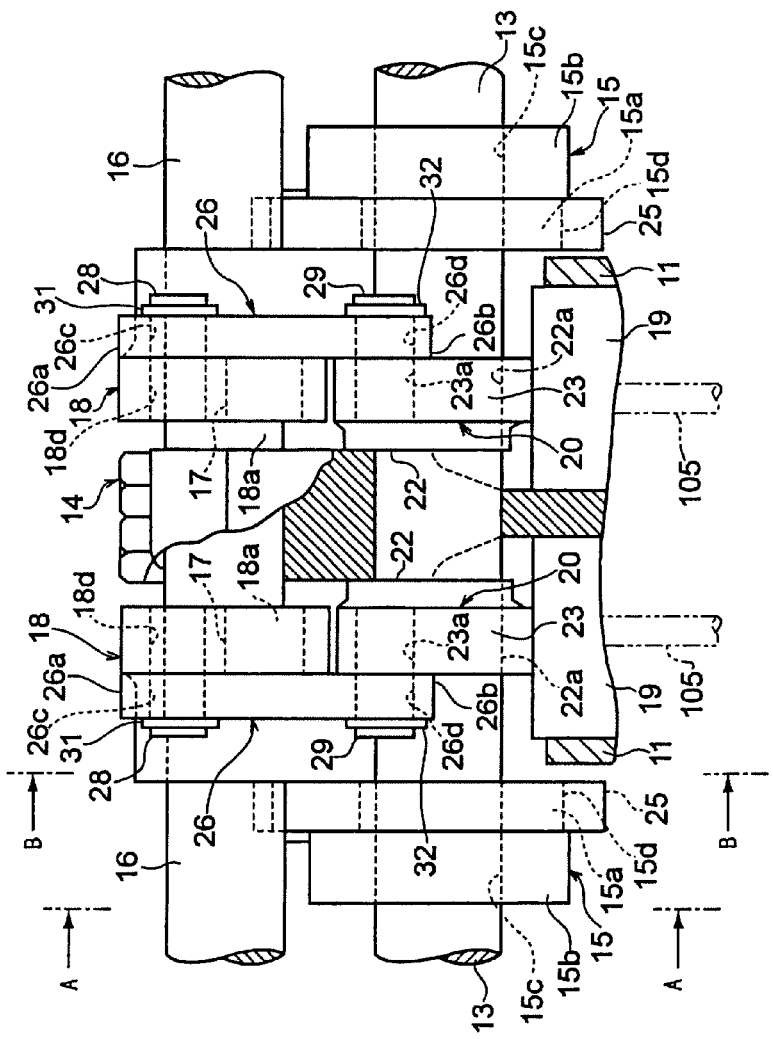
FIG. 3 is a side view illustrating the variable lift mechanism.
Figure 4:
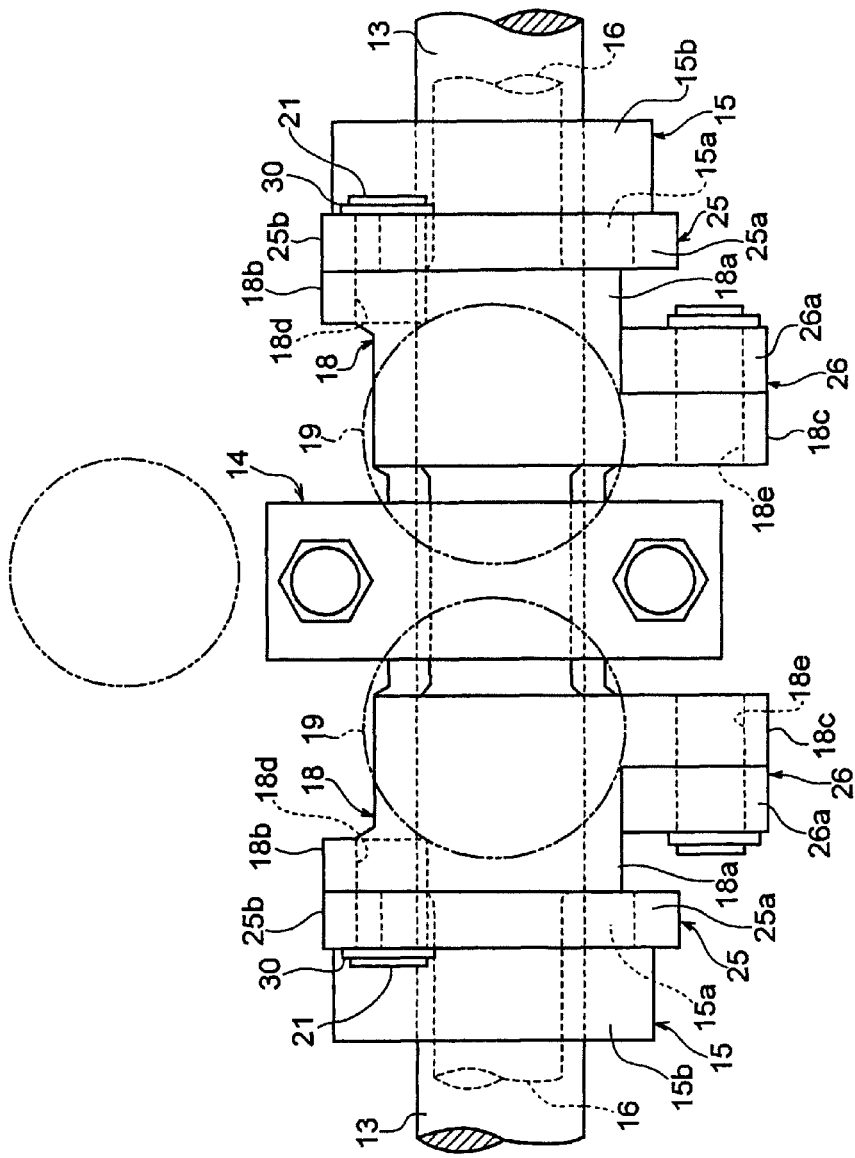
FIG. 4 is a plan view illustrating the variable lift mechanism.

FIGS. 2 to 4 show a detailed structure of variable lift mechanism 112.

Variable lift mechanism 112 shown in FIGS. 2 to 4 includes a pair of inlet valves 105 and 105, a hollow cam shaft (drive shaft) 13 which is rotatably supported by a cam shaft bearing 14 of a cylinder head 11, two eccentric cams 15 and 15 (drive cam) which are of a rotary cam journaled in cam shaft 13, a control shaft 16 which is located above cam shaft 13 and rotatably supported by the same bearing 14, a pair of rocker arms 18 and 18 which is swingably supported by control shaft 16 with control cam 17 interposed therebetween, and a pair of oscillating cams 20 and 20 which is independently disposed in upper end portions of inlet valves 105 and 105 with valve lifters 19 and 19 interposed therebetween respectively.

The eccentric cams 15 and 15 and the rocker arms 18 and 18 are linked to each other by link arms 25 and 25, and rocker arms 18 and 18 and oscillating cams 20 and 20 are linked to each other by link members 26 and 26.

Rocker arms 18 and 18, link arms 25 and 25, and link members 26 and 26 constitute the transmission mechanism.

Figure 5:
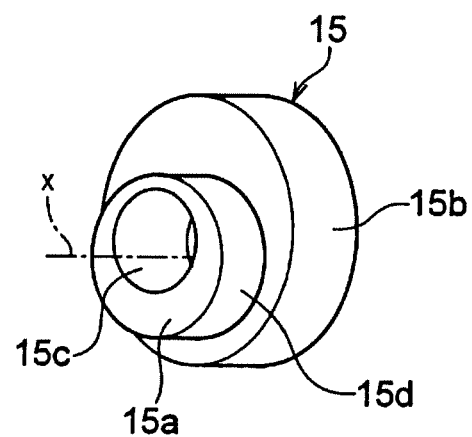
FIG. 5 is a perspective view illustrating an eccentric cam used in the variable lift mechanism.

Referring to FIG. 5, eccentric cam 15 having a substantial ring shape includes a small-diameter cam main body 15a and a flange portion 15b which is integrally provided in an outside end face of cam main body 15a. A cam shaft insertion hole 15c is formed to penetrate through eccentric cam 15 in an inside axis direction, and an axial center X of cam main body 15a is shifted from an axial center Y of cam shaft 13 by a predetermined amount.

Further, the eccentric cams 15 are press-fitted in and fixed to cam shaft 13 through cam shaft insertion holes 15c on outsides of valve lifters 19 so as not to interfere with valve lifter 19.

Referring to FIG. 4, rocker arm 18 is formed to be bent into a substantial crank shape, and a ventral base portion 18a is rotatably supported by control cam 17.

A pin hole 18d is formed to penetrate through one end portion 18b projected from an outside end portion of base portion 18a, and a pin 21 coupled to a forefront portion of link arm 25 is press-fitted in pin hole 18d. A pin hole 18e is formed to penetrate through the other end portion 18c projected from an inside end portion of base portion 18a, and a pin 28 coupled to one end portion 26a of each link member 26 is press-fitted in pin hole 18e.

Control cam 17 has a cylindrical shape, and is fixed to an outer circumference of control shaft 16. As shown in FIG. 2, an axial center P1 of control cam 17 is shifted from an axial center P2 of control shaft 16 by α.

Figure 6:
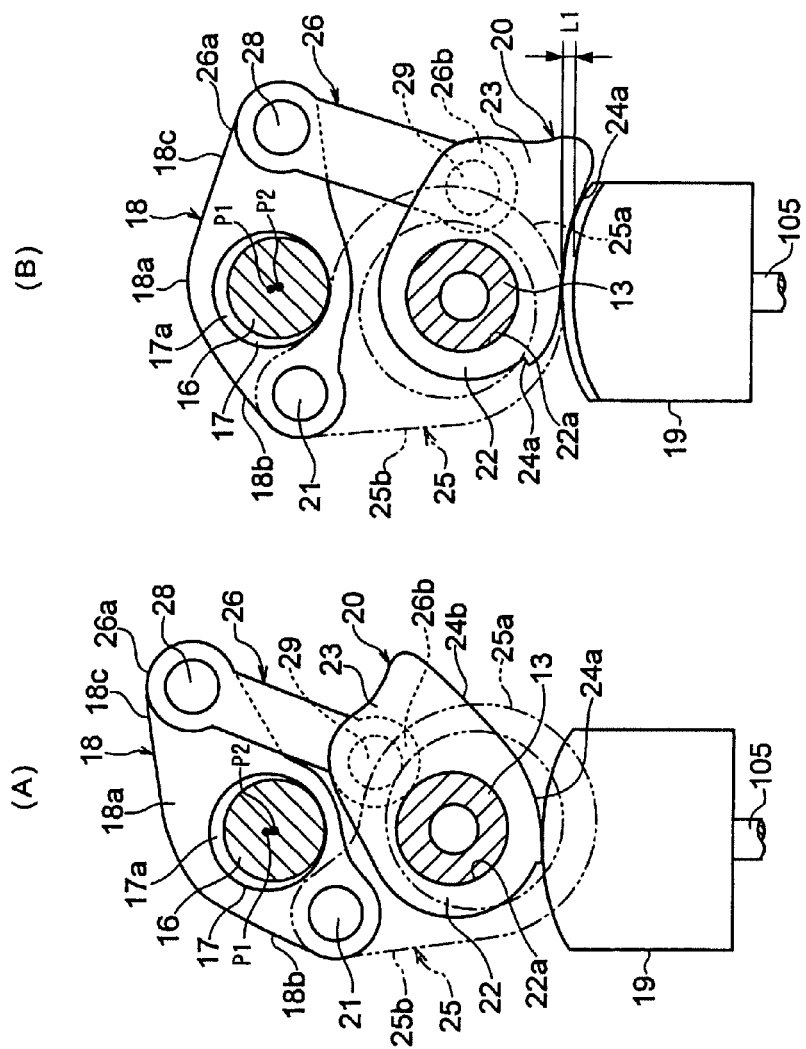
FIG. 6 is a sectional view illustrating action during low lift of the variable lift mechanism (sectional view taken on a line B-B of FIG. 3)
Figure 7:
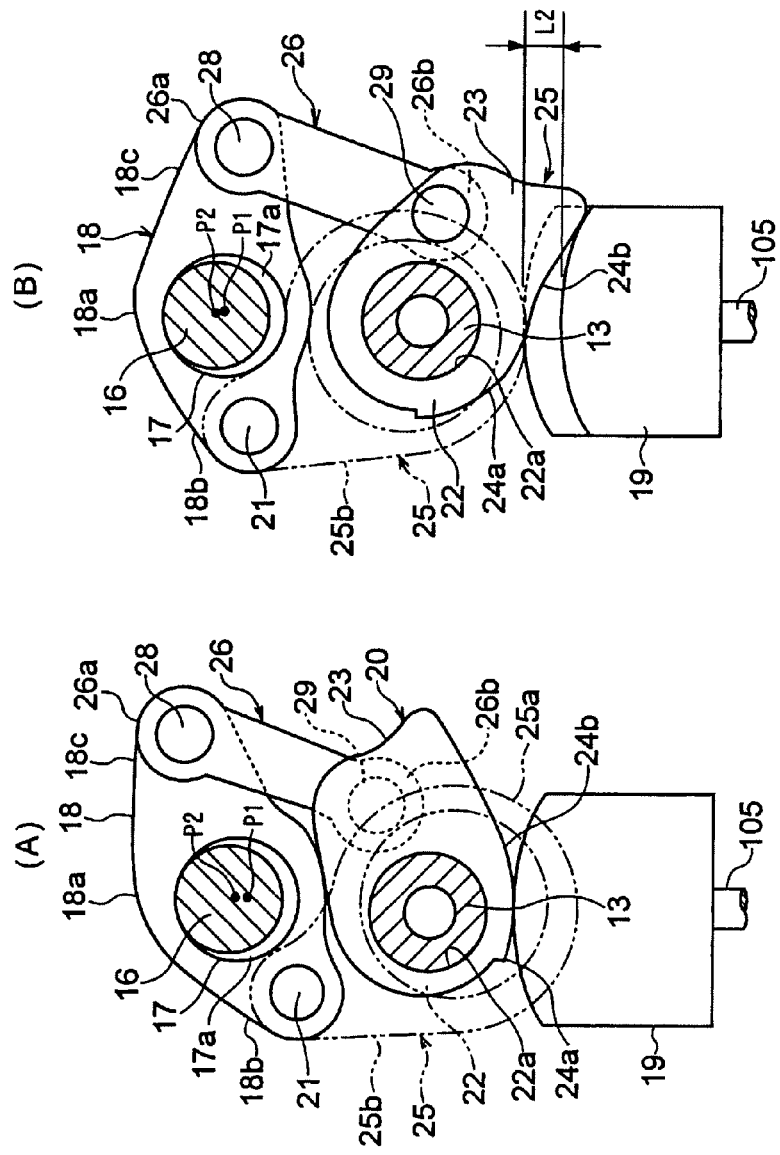
FIG. 7 is a sectional view illustrating action during high lift of the variable lift mechanism (sectional view taken on a line B-B of FIG. 3)

Referring to FIGS. 2, 6, and 7, oscillating cam 20 has a substantial U-shape when viewed from the side, cam shaft 13 is fitted in and rotatably supported by a support hole 22a, support hole 22a is formed to penetrate through a substantially ring-shaped base end portion 22, and a pin hole 23a is formed to penetrate through an end portion 23 located on the side of the other end portion 18c of rocker arm 18.

Further, a base circle surface 24a on the side of base end portion 22 and a cam surface 24b which is extended in an arc shape from base circle surface 24a toward the end edge side of end portion 23 are formed in a lower surface of oscillating cam 20. Base circle surface 24a and cam surface 24b come into contact with predetermined positions in upper surfaces of each valve lifters 19 according to a swing position of oscillating cam 20.

Figure 8:
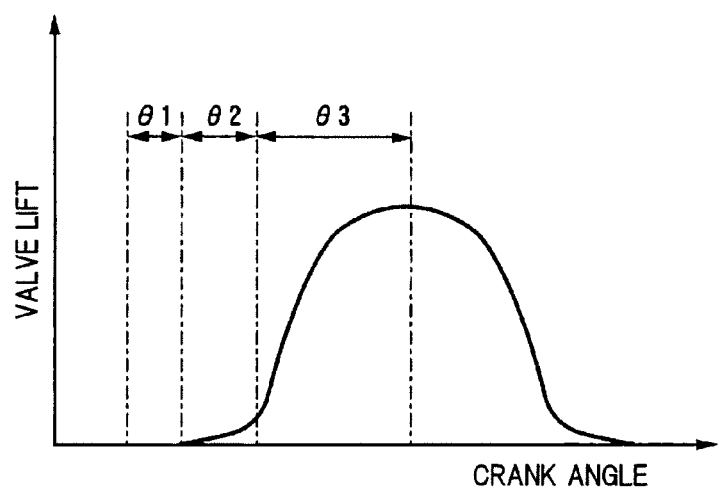
FIG. 8 is a characteristic view illustrating valve lift corresponding to a base end face and a cam surface of an oscillating cam in the variable lift mechanism.

That is, from the viewpoint of valve lift characteristic shown in FIG. 8, as shown in FIG. 2, a predetermined angle range θ1 of base circle surface 24a is a base circle interval, a so-called ramp interval ranges from the base circle interval θ1 to a predetermined angle range θ2 of cam surface 24b, and a lift interval ranges from ramp interval θ2 to predetermined angle range θ3 of cam surface 24b.

Further, Link arm 25 includes an annular base portion 25a and a projection end 25b provided at a predetermined position in an outer circumferential surface of base portion 25a. A fitting hole 25c is formed at a center position of base portion 25a to be rotatably fitted to the outer circumferential surface of cam main body 15a of eccentric cam 15. A pin hole 25d is formed to penetrate through projection end 25b, and pin 21 is rotatably inserted in pin holes 25d.

Furthermore, Link member 26 having a predetermined length is linearly formed. In link member 26, pin through-holes 26c and 26d are formed to penetrate through circular end portions 26a and 26b. End portions of pins 28 and 29 press-fitted in pin holes 18d and 23a of the other end portion 18c of rocker arm 18 and end portion 23 of oscillating cam 20 are rotatably inserted in pin through-holes 26c and 26d.

Each of snap rings 30, 31, and 32 for controlling movement in an axial direction of link arm 25 or link member 26 are provided in one end portion of each of pins 21, 28, and 29.

In the above configuration, as shown in FIGS. 6 and 7, the maximum valve lift amount is changed according to a positional relationship between axial center P2 of control shaft 16 and axial center P1 of control cam 17, and the rotation drive of control shaft 16 changes axial center P2 of control shaft 16 relative to axial center P1 of control cam 17, thereby changing the maximum valve lift amount.

Figure 9:
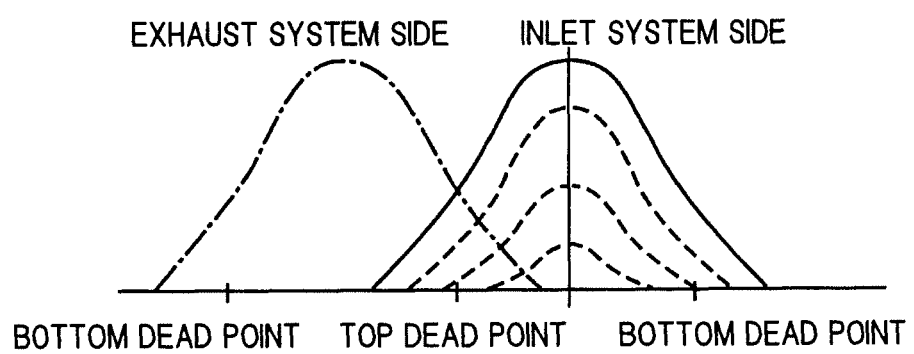
FIG. 9 is a characteristic view illustrating valve timing and valve lift of the variable lift mechanism.
Figure 10:
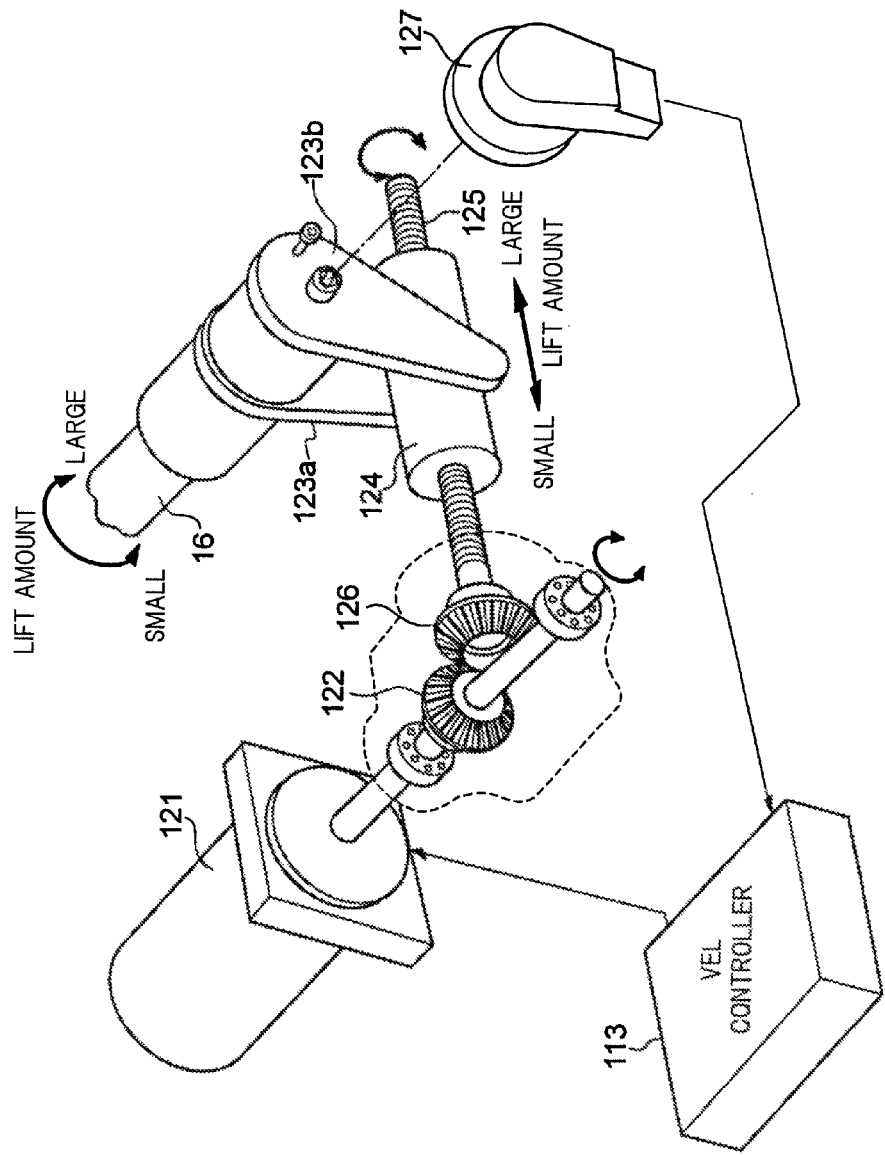
FIG. 10 is a perspective view illustrating a rotary drive mechanism of a control shaft in the variable lift mechanism.

In the configuration as shown in FIG. 10, control shaft 16 is driven to rotate by a motor (electric actuator) 121 within a predetermined rotational angle range restricted by a stopper, and an angle of control shaft 16 is changed by motor 121, thereby continuously changing the maximum valve lift amount and valve operation angle of inlet valve 105 within a variable range restricted by the stopper (see FIG. 9).

For example, a DC servo motor is adopted as motor 121.

Referring to FIG. 10, a rotational shaft of motor 121 is disposed in parallel to control shaft 16, and a bevel gear 122 is journaled in a forefront of the rotational shaft.

On the other hand, a pair of stays 123a and 123b is fixed to the forefront of control shaft 16, and a nut 124 is swingably supported around a shaft which connects forefront portions of the pair of stays 123a and 123b and is parallel to control shaft 16.

A bevel gear 126 which engages bevel gear 122 is journaled in a forefront of screw stock 125 which engages nut 124. Screw stock 125 is rotated by the rotation of motor 121, and the position of nut 124 which engages screw stock 125 is displaced in the axial direction of screw stock 125, thereby rotating control shaft 16.

The direction in which the position of nut 124 is brought close to bevel gear 126 is a direction in which the maximum valve lift amount is decreased, and the direction in which the position of nut 124 is moved away from bevel gear 126 is a direction in which the maximum valve lift amount is increased.

Referring to FIG. 10, a potentiometer type angle sensor 127 for detecting a rotational angle of control shaft 16 is provided at the forefront of control shaft 16. The VEL controller 113 performs feedback control of the current passed through motor 121 such that the actual angle of control shaft 16 detected by angle sensor 127 is brought close to target angle (which is equivalent to the target maximum valve lift amount) computed by ECM 114.

Figure 11:
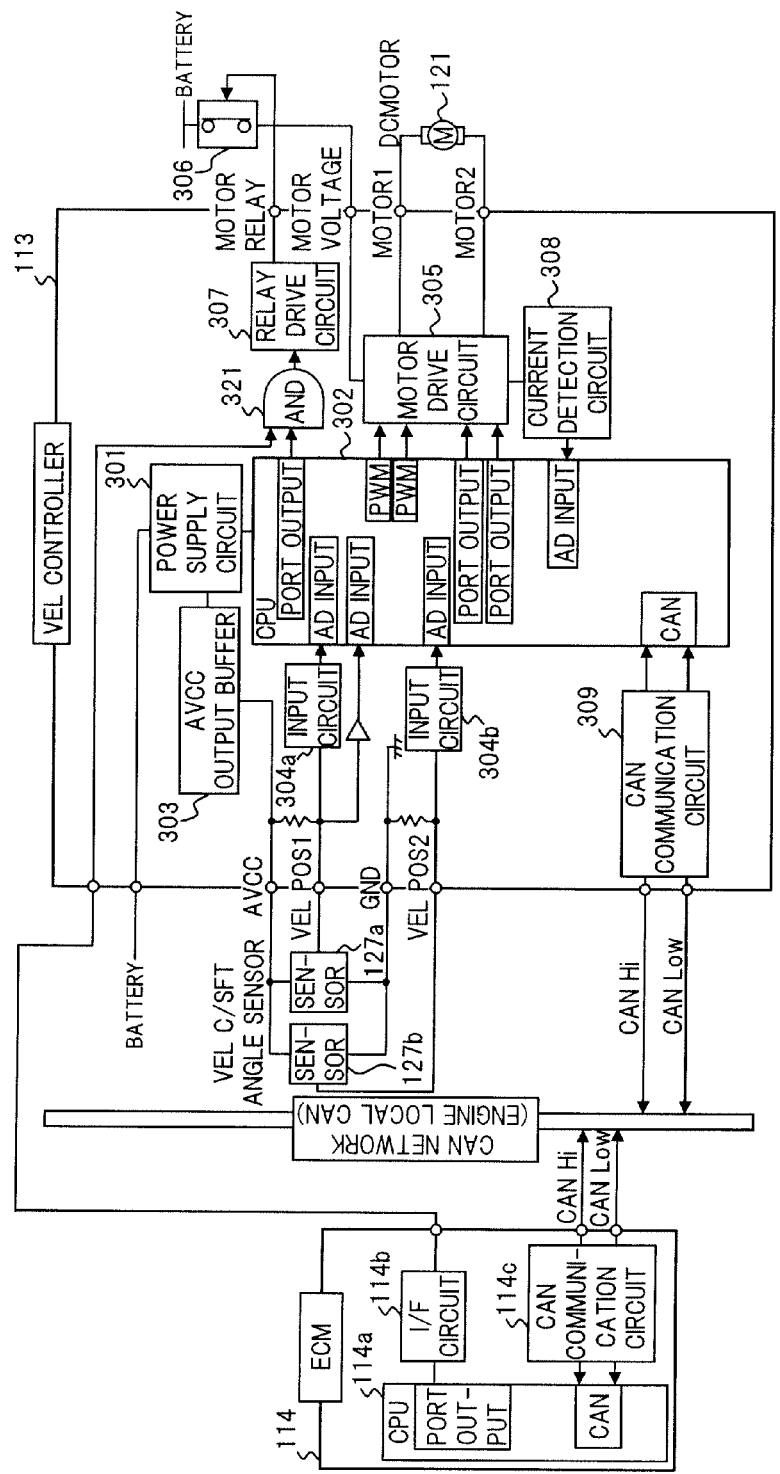
FIG. 11 is a circuit block diagram illustrating a VEL controller and a control system including ECM according to a first embodiment of the present invention.

FIG. 11 shows a circuit configuration of VEL controller 113 (second control unit) and ECM 114 (first control unit) according to a first embodiment of the present invention.

Referring to FIG. 11, a battery voltage is supplied to a power supply circuit 301 of VEL controller 113, and an electric power is supplied to CPU 302 through power supply circuit 301.

Further, the power supply voltage is supplied from power supply circuit 301 to an external angle sensor 127 through a power supply buffer circuit 303, and output of angle sensor 127 is read in CPU 302 through an input circuit 304.

The angle sensors 127 are doubly provided, and two systems (304a and 304b) are also provided in input circuit 304 corresponding to angle sensors 127a and 127b. In a normal state in which detection angles of the sensors are substantially equal to each other, motor 121 is controlled based on an average value of the detection angles of the sensors or one of the sensor outputs.

Furthermore, a motor drive circuit 305 for driving motor 121 is provided, and a pulse width modulation signal PWM is input from CPU 302 into motor drive circuit 305 as a manipulated variable for driving motor 121 in a normally rotational direction and a reversely rotational direction.

The battery voltage is supplied to motor drive circuit 305 through an externally-provided relay circuit 306, and relay circuit 306 is turned on and off by a relay drive circuit 307.

A current detection circuit 308 is also provided to detect a current of motor 121.

Relay drive circuit 307 turns on relay circuit 306 to supply the electric power to motor drive circuit 305 when the output of an AND circuit (logical multiplication circuit) 321 is set at a high level (1), and relay drive circuit 307 turns off relay circuit 306 to cut off the electric power supplied to motor drive circuit 305 when the output of AND circuit 321 is set at a low level (0).

While a port output of CPU 302 of VEL controller 113 is input into one of the two input terminals of AND circuit 321, a port output of a CPU 114a of ECM 114 is input into the other input terminal of AND circuit 321 through an interface circuit (I/F circuit) 114b, and the logical multiplication of 4each port outputs is performed.

VEL controller 113 includes a communication circuit 309 to conduct communication with ECM 114. Further, ECM 114 includes a communication circuit 114c to conduct communication with VEL controller 113, and the intercommunication can be conducted between VEL controller 113 and ECM 114.

The communication is conducted between VEL controller 113 and ECM 114 through CAN (Controller Area Network) which is of an in-vehicle network specification.

The target angle of control shaft 16, which is computed by ECM 114 based on the accelerator opening and the rotation speed of the engine, is transmitted to VEL controller 113, and the actual angle of control shaft 16 detected by angle sensor 127 is sent from VEL controller 113 to ECM 114.

Further, the VEL controller 113 and ECM 114 separately diagnose the existence of the abnormality in the drive control of motor 121 (variable lift mechanism 112), and VEL controller 113 and ECM 114 transmit the diagnostic results to each other. When the abnormality exists in at least one of the own diagnostic result and the other diagnostic result, VEL controller 113 and ECM 114 is configured to set the output (output of abnormal determination signal) to AND circuit 321 such that the output of AND circuit 321 is set at the low level (0).

The detailed diagnostic process in VEL controller 113 and ECM 114 will be described below.

Figure 12:
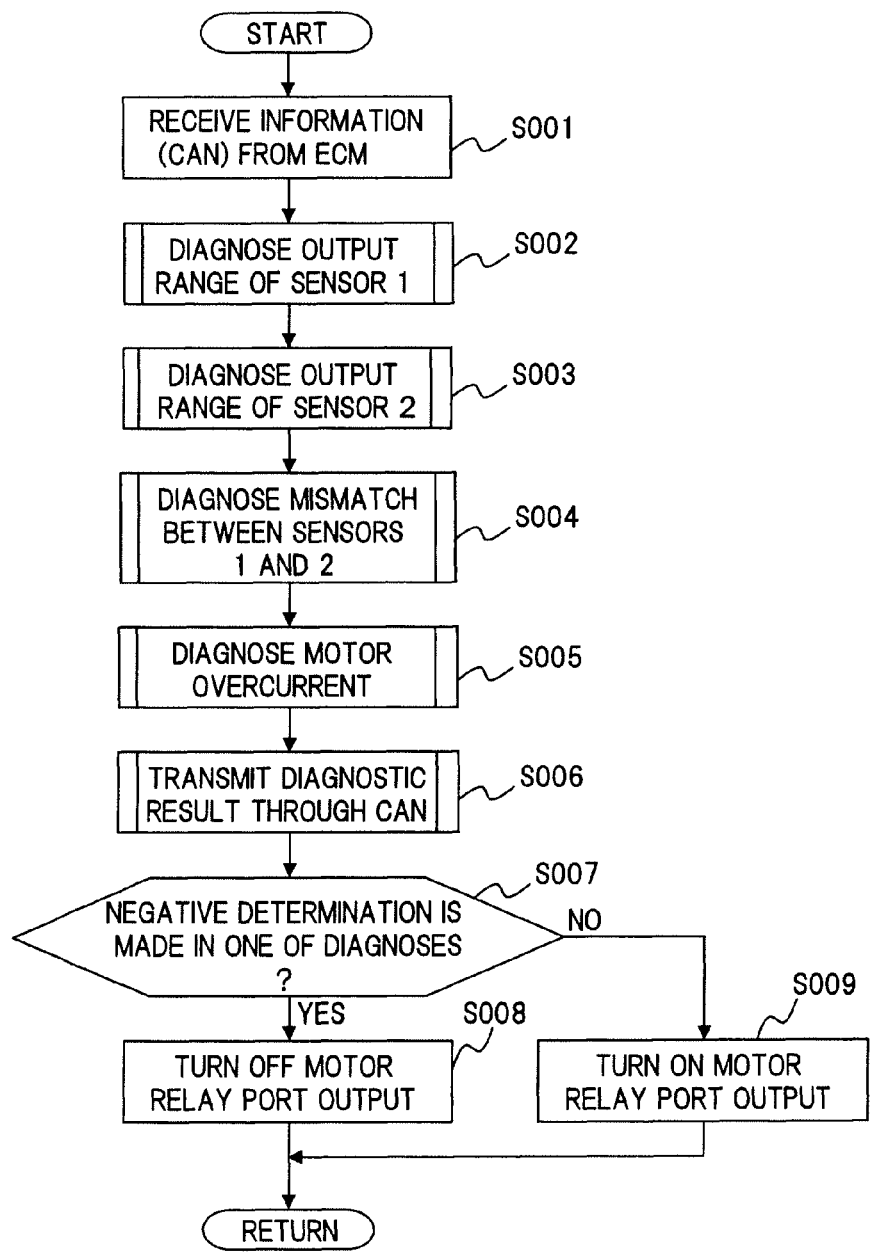
FIG. 12 is a flowchart illustrating a diagnostic process in the VEL controller.

FIG. 12 is a flowchart showing a routine of the process performed by VEL controller 113, and it is assumed that the process of FIG. 12 is performed at every predetermined period.

In Step S001, VEL controller 113 takes in the information from ECM 114.

For example, the information includes the target angle (target maximum valve lift amount) of control shaft 16 in addition to the diagnostic result of ECM 114.

In Step S002, VEL controller 113 performs a failure diagnosis of angle sensor 127a (sensor 1). In Step S003, similarly to Step S002, VEL controller 113 performs a failure diagnosis of angle sensor 127b (sensor 2).

In Step S004, VEL controller 113 determines whether or not the outputs of angle sensors 127a and 127b are matched with each other (mismatch diagnosis).

In Step S005, VEL controller 113 determines whether or not an overcurrent is passed through motor 121.

The diagnostic contents of Steps S002 to S005 are described in detail later.

In Step S006, VEL controller 113 transmits the diagnostic results in Steps S002 through S005 to ECM 114.

In Step S007, VEL controller 113 determines whether or not the abnormality determination is made in any of Steps S002 to S005 and/or whether or not the abnormality determination is made in the diagnosis on the side of ECM 114.

When the abnormality determination is made in any of Steps S002 to S005 and/or when the abnormality determination is made in the diagnosis on the side of ECM 114, the routine goes to Step S008, and the output to AND circuit 321 is set at OFF (low level) to turn off relay circuit 306.

Accordingly, in not only the case in which the abnormality is generated in the diagnosis on the side of VEL controller 113 but also the case in which the abnormality is generated in the diagnosis on the side of ECM 114, relay circuit 306 is turned off to cut off the electric power supplied to motor drive circuit 305.

Therefore, motor 121 is usually driven to control the maximum valve lift amount at an abnormal value can be prevented when the abnormality is generated.

Further, when the output from VEL controller 113 to AND circuit 321 is set at OFF (low level) which is of the abnormal determination signal, even if the output on the side of ECM 114 to AND circuit 321 is set at ON (high level), the output from AND circuit 321 is set at OFF (low level), and relay circuit 306 is turned off to thereby cut off the electric power supplied to motor drive circuit 305.

Accordingly, even if a failure in which the input to AND circuit 321 cannot be set at the low level is generated on the side of ECM 114, relay circuit 306 can be turned off because the input to AND circuit 321 is set at the low level on the side of VEL controller 113.

At this point, while the output to AND circuit 321 is set at OFF (low level), a signal for providing an instruction to stop the current passed through motor 121 can be output as a control signal to motor drive circuit 305.

In such cases, the current passed through motor 121 can be stopped even if an abnormality in which relay circuit 306 cannot be turned off by the output to AND circuit 321.

In the case of a minor abnormality, the high-level signal is input into AND circuit 321 to keep relay circuit 306 at the on state, which allows the control signal to motor drive circuit 305 to be restricted while the electric power supplied to motor drive circuit 305 is continued.

Examples of the restriction of the control signal include as follows: the variable range of the maximum valve lift amount of variable lift mechanism 112 is restricted to a predetermined low-lift region; and the target maximum valve lift amount of variable lift mechanism 112 is fixed to a previously-stored reference value.

For example, the target maximum valve lift of the reference can be set at the maximum valve lift amount in the case where the maximum valve lift amount is fixed without providing variable lift mechanism 112. Therefore, even if the maximum valve lift amount is fixed, running performance can be prevented from largely decreasing.

Thus, when the abnormal diagnosis is made, the drive control of the electric actuator is performed by the restricted manipulated variable, so that it can be prevented that the electric actuator is controlled by the improper manipulated variable due to the abnormality in the control.

An example of the minor abnormality includes the case in which one of angle sensors 127a and 127b is normally operated while the other breaks down.

Further, when the abnormal diagnosis is made on the side of ECM 114 while all the diagnostic results in Steps S002 to S005 are normal, the output to AND circuit 321 is not directly set at OFF (low level), but the abnormal diagnostic result on the side of ECM 114 is continued for a predetermined time or more, after that, the output to AND circuit 321 can be set at OFF (low level).

Thus, when the OFF control of relay circuit 306 is delayed, the mistaken turn-off of relay circuit 306 due to a temporary abnormality in the communication can be prevented to enhance reliability of the fail-safe control.

The predetermined time which is of the delay time is previously adapted as a time enough to be able to confirm that the abnormality in the communication is not generated.

In the case where the information indicating normal or abnormal cannot be received from the side of ECM 114, or in the case where the signal of itself indicating normal or abnormal is abnormal, preferably the abnormal determination is made to set the output to AND circuit 321 at the low level, which allows relay circuit 306 to be turned off, even if the abnormality is generated in the communication.

In the case where the signal indicating the diagnostic result transmitted from the side of ECM 114 is not regular, it can be estimated that CPU 114a of ECM 114 is abnormal. Therefore, the output to AND circuit 321 is also set at the low level.

On the other hand, when the normal determination is made in Steps S002 to S005, and when the normal diagnosis is made on the side of ECM 114, the routine goes to Step S009, and the output to AND circuit 321 is set at ON (high level).

At this point, when the output to AND circuit 321 is also set at ON (high level) on the side of ECM 114, relay circuit 306 is turned on to supply the electric power to motor drive circuit 305, which allows the usual drive control of motor 121.

Figure 13:
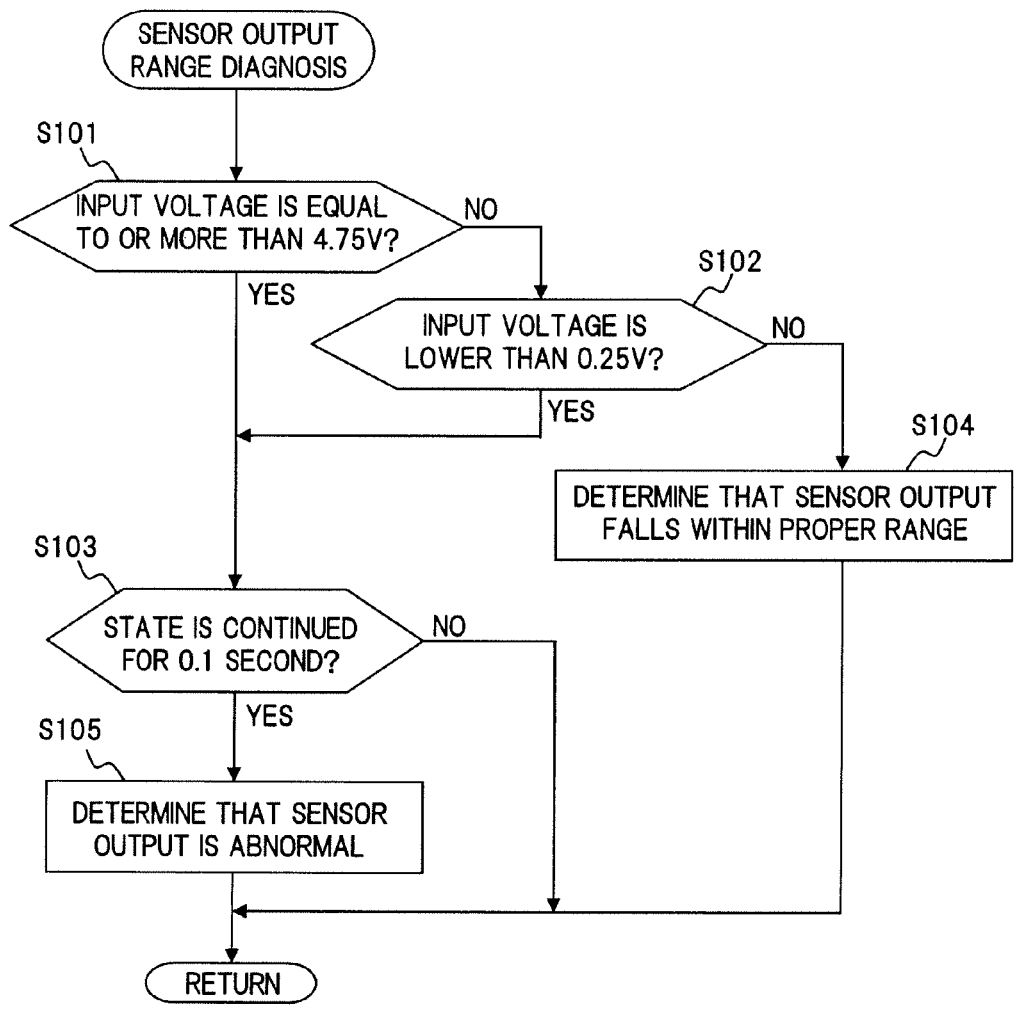
FIG. 13 is a flowchart illustrating a sensor output diagnosis performed by the VEL controller.

The diagnoses of angle sensors 127a and 127b in Steps S002 and S003 are performed according to a flowchart of FIG. 13.

In the first embodiment, it is assumed that each of angle sensors 127a and 127b is a sensor (for example, potentiometer) whose output voltage is changed according to the angle of control shaft 16.

In Step S101, VEL controller 113 determines whether or not an output voltage of the sensor is equal to or more than a previously-stored upper limit (for example, 4.75V).

The upper limit is set at a high value which exceeds a usual variable range of the sensor output voltage, and the upper limit is set at a value which the sensor does not exceed in the normal state.

When the output voltage of the sensor is equal to or more than the upper limit, the routine goes to Step S103, and VEL controller 113 determines whether or not the state is continued for a predetermined time (for example, one second) or more.

The predetermined time is set at a minimum time in which the temporary voltage fluctuation can be distinguished from a voltage change caused by a short circuit or an open circuit.

Accordingly, when the state in which the output voltage of the sensor is equal to or more than the upper limit is continued for the predetermined time or more, VEL controller 113 can determine that not the temporary abnormality in the voltage but the continuous abnormality such as the short circuit is generated. In such cases, the routine goes to Step S105, VEL controller 113 determines that the sensor output is abnormal.

On the other hand, when VEL controller 113 determines that the output voltage of the sensor is lower than the upper limit in Step S101, the routine goes to Step S102.

In Step S102, VEL controller 113 determines whether or not the output voltage of the sensor is lower than a previously-stored lower limit (for example, 0.25V).

The lower limit is set at a low value which falls below the usual variable range of the sensor output voltage, and the lower limit is set at a value which the sensor does not fall below in the normal state.

When the output voltage of the sensor is lower than the lower limit, the routine goes to Step S103, and VEL controller 113 determines whether or not the state is continued for the predetermined time or more.

When the state in which the output voltage of the sensor is lower than the lower limit is continued for the predetermined time or more, VEL controller 113 can determine that not the temporary abnormality in the voltage but the continuous abnormality such as the short circuit is generated. In such cases, the routine goes to Step S105, VEL controller 113 determines that the sensor output is abnormal.

When the negative determination is made in Step S102, the routine goes to Step S104, and VEL controller 113 determines that the output voltage of the sensor falls within a proper range of the lower limit to the upper limit.

The method for diagnosing the abnormality of angle sensors 127a and 127b is not limited to the method shown by the flowchart of FIG. 13, but various known diagnosis methods can be adopted according to a system and a kind of the angle sensor.

Figure 14:
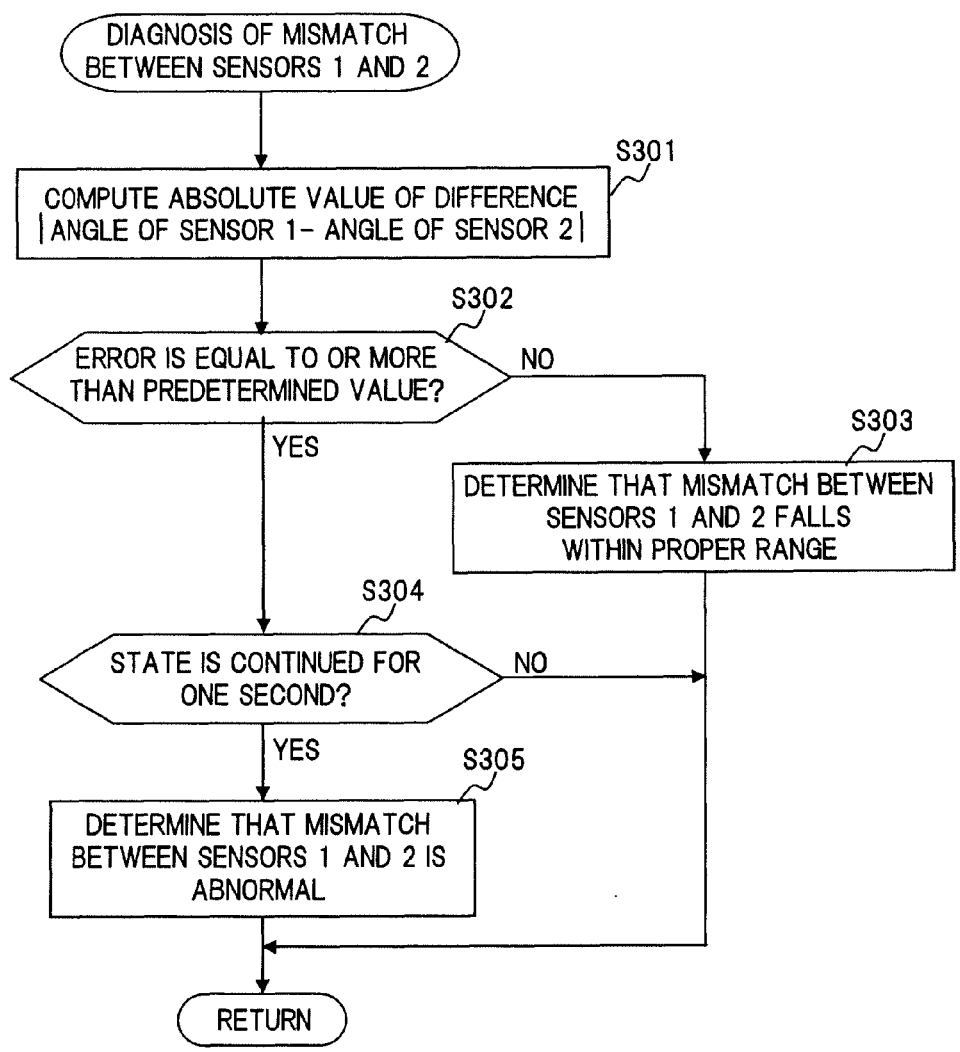
FIG. 14 is a flowchart illustrating a sensor mismatch diagnosis performed by the VEL controller.

FIG. 14 is a flowchart showing the detailed mismatch diagnosis in Step S004.

In Step S301, an absolute value of a difference between a detection angle based on the output of angle sensor 127a and a detection angle based on the output of angle sensor 127b is computed as an error amount.

The detection angle based on the sensor output shall mean result in which the output voltage of each of angle sensors 127a and 127b is converted into the angle of control shaft 16, the characteristic of converting the output voltage into the angle may be a fixed characteristic commonly used in each sensor or a characteristic learned by each sensor.

In Step S302, VEL controller 113 determines whether or not the error amount is equal to or more than a predetermined value.

The predetermined value is previously set based on a permissible value of an angle detection error. When the error amount is equal to or more than the predetermined value, VEL controller 113 determines that an error exceeding the permissible level is generated in the angle detected by at least one of the sensors.

On the other hand, when the error amount is lower than the predetermined value, VEL controller 113 determines that the error of the angle detected by the sensor falls within the permissible level, and the routine goes to Step S303. In Step S303, VEL controller 113 determines that angle sensors 127a and 127b are normal (namely, the mismatch does not exist).

When, in Step S302, the error amount is equal to or more than the predetermined value, the routine goes to Step S304. In Step S304, VEL controller 113 determines whether or not the state is continued for a predetermined time (for example, one second) or more.

The predetermined time is used to distinguish a temporary deviation of the detection angle between the sensors from a deviation of the detection angle caused by the abnormality in the sensor. When the state in which the error amount is equal to or more than the predetermined value is continued for the predetermined time or more, VEL controller 113 determines that some sort of abnormality is generated in at least one of the sensors, and the routine goes to Step S305. In Step S305, VEL controller 113 determines that angle sensors 127a and 127b are abnormal (namely, the mismatch is generated).

In the case where one of angle sensors 127a and 127b is substantially normally operated although the generation of the open circuit or short circuit is detected in the other angle sensor, VEL controller 113 determines the minor abnormality, and the electric power can be supplied to drive circuit 305 to continue the feedback control using the detection result of the normally operated sensor. In such cases, as described above, preferably, the variable range of the maximum valve lift amount of variable lift mechanism 112 is restricted to the predetermined low-lift region, or the target maximum valve lift is fixed to the previously-stored reference value.

Figure 15:
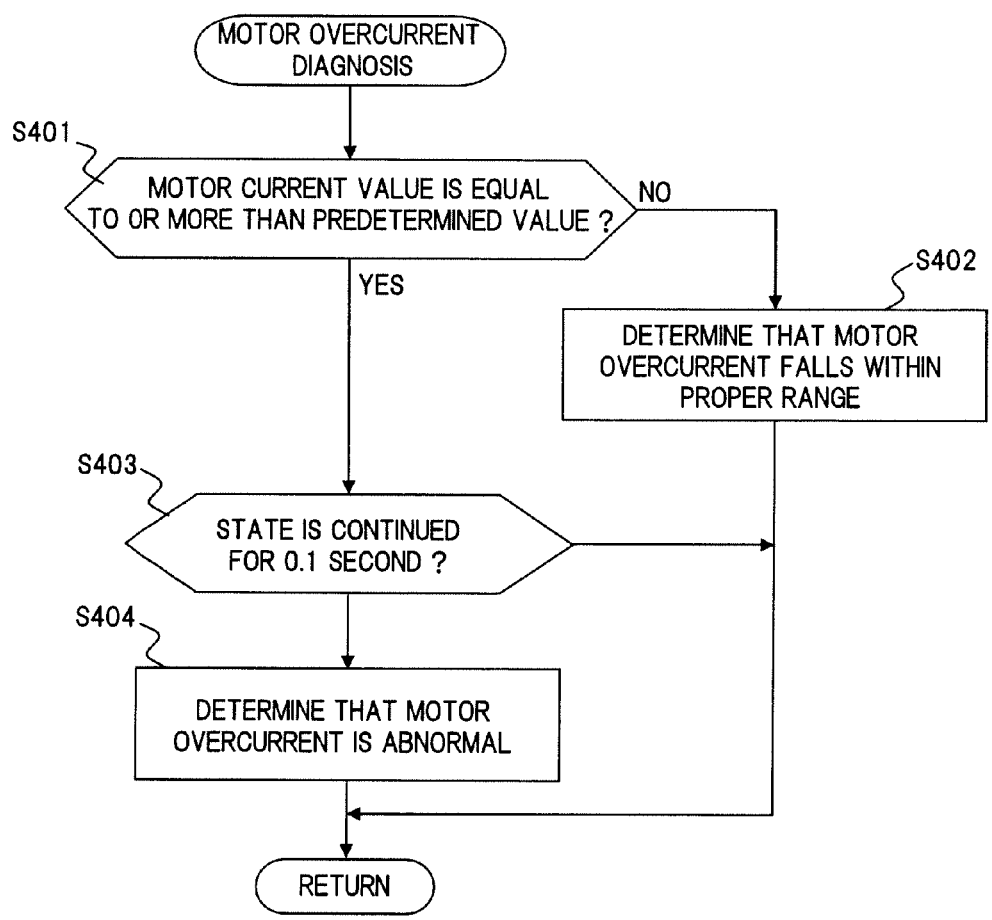
FIG. 15 is a flowchart illustrating a motor overcurrent diagnosis performed by the VEL controller.

FIG. 15 is a flowchart showing the detailed overcurrent diagnosis in Step S005.

In Step S401, VEL controller 113 determines whether or not the current which is actually passed through motor 121 and detected by the current detection circuit 308 is equal to or more than a predetermined value.

The predetermined value is set at a value which exceeds a range of the current passed through motor 121 in the usual control state. When the actual current exceeds the predetermined value, there is a possibility that a transistor breaks down in drive circuit 305.

When the current actually passed through motor 121 is lower than the predetermined value in Step S401, because the current which falls within the usual range is passed through motor 121, the routine goes to Step S402. In Step S402, VEL controller 113 determines that the current of motor 121 is normal.

On the other hand, when in Step S401, the current actually passed through motor 121 is not lower than the predetermined value in Step S401, there is a possibility that the transistor breaks down. However, there is also a possibility that the current is instantaneously increased by a noise. Therefore, the routine goes to Step S403, VEL controller 113 determines whether or not the state is continued for a predetermined time (for example, 0.1 second) or more.

In Step S403, the predetermined time is previously adapted in order to distinguish the instantaneously-increased current caused by the noise from the steadily-increased current caused by the failure, and the like, of the transistor.

When, in Step S403, the state in which the motor current is equal to or more than the predetermined value is continued for the predetermined time or more, the routine goes to Step S404, and VEL controller 113 determines whether or not the overcurrent is passed through motor 121.

The diagnostic object on the side of VEL controller 113 is not limited to the failure diagnosis of angle sensor 127 and the overcurrent of motor 121.

Figure 16:
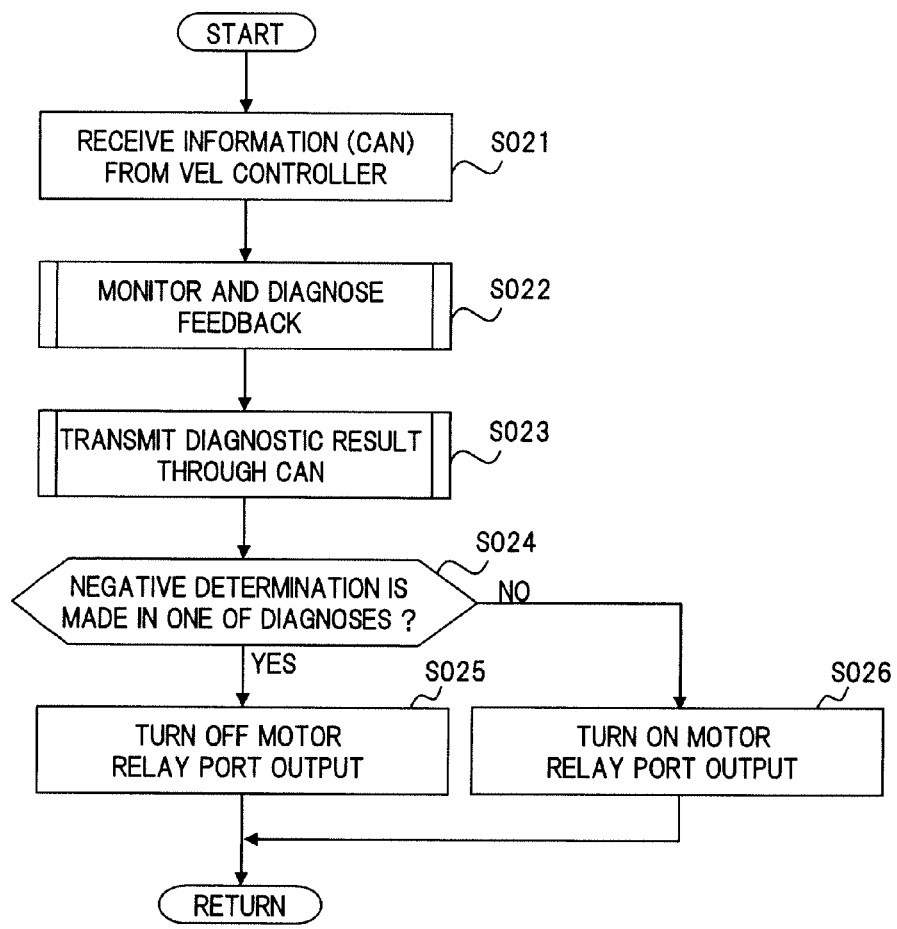
FIG. 16 is a flowchart illustrating a diagnostic process in ECM.

FIG. 16 is a flowchart showing a routine of a diagnostic process on the side of ECM 114, and it is assumed that the diagnostic process of FIG. 16 is performed at every predetermined period.

In Step S021, ECM 114 receives information from VEL controller 113.

For example, the information includes the actual angle of control shaft 16 detected by angle sensor 127 in addition to the diagnostic result of VEL controller 113.

In Step S022, ECM 114 diagnoses a feedback control state of motor 121 on the basis of the target angle.

Figure 17:
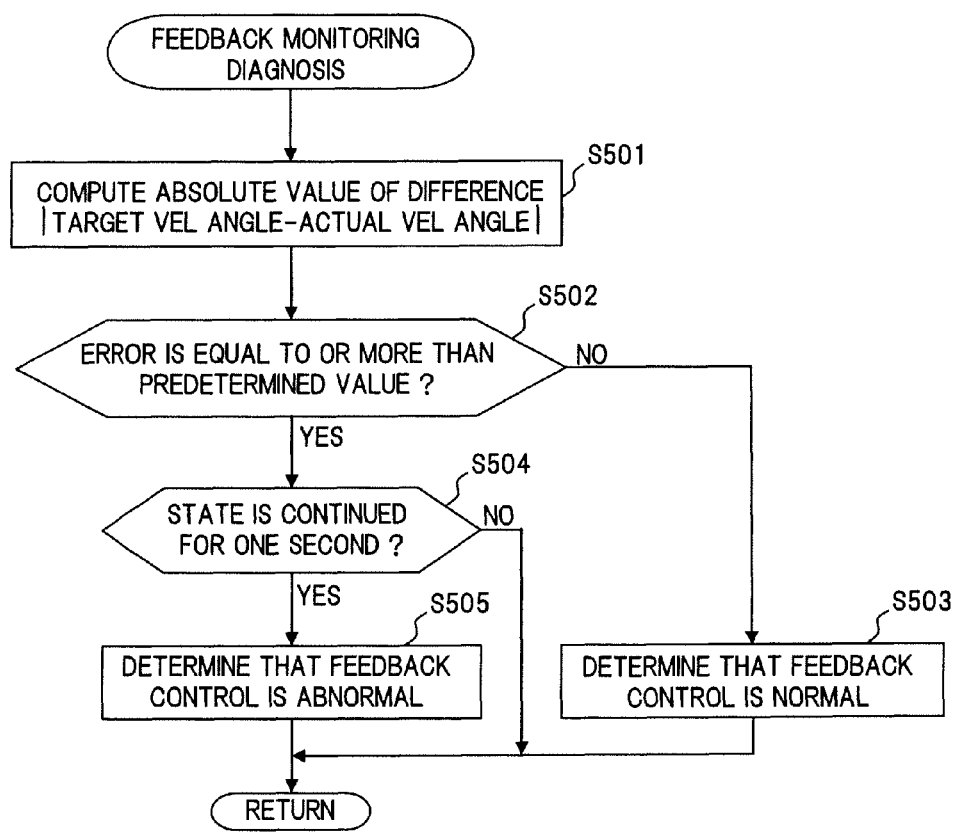
FIG. 17 is a flowchart illustrating a feedback control response diagnosis performed by ECM.

The detailed diagnosis in Step S022 is shown in a flowchart of FIG. 17.

In Step S501, an absolute value of a difference between the target angle of control shaft 16 and the actual angle of control shaft 16 sent from VEL controller 113 is computed as an error amount.

In Step S502, ECM 114 determines whether or not the error amount is equal to or more than a predetermined value.

The predetermined value is previously set from the characteristic of VEL mechanism 112 and a gain of the feedback control, and the predetermined value is set at a value which the error amount hardly exceeds in the usual feedback control state.

When the error amount is lower than the predetermined value, ECM 114 determines that the normal feedback control is performed and the actual angle follows the change in target angle with a sufficient response, and the routine goes to Step S503. In Step S503, ECM 114 determines that the feedback control is normal.

On the other hand, when the error amount is equal to or more than the predetermined value, the routine goes to Step S504, and ECM 114 determines whether or not the state in which the error amount is equal to or more than the predetermined value is continued for a predetermined time (for example, one second) or more.

Sometimes the noise is superimposed on the output of angle sensor 127 to instantaneously change the detection result of the angle, whereby the error amount may be equal to or more than the predetermined value. Therefore, in order to distinguish the state in which the large error amount is steadily generated from the instantaneously-increased error amount caused by an influence of the noise, ECM 114 determines whether or not the state is continued for the predetermined time or more, and the predetermined time is previously adapted.

When the state in which the error amount is equal to or more than the predetermined value is continued for the predetermined time (for example, one second) or more, because ECM 114 determines that not the error amount caused by an influence of the noise but the large error amount is steadily generated, the routine goes to Step S505. In Step S505, ECM 114 determines that the feedback control (transient response) is abnormal.

Referring to FIG. 16, when ECM 114 diagnoses the abnormal feedback control in Step S022, ECM 114 transmits the diagnostic result onto the side of VEL controller 113 in Step S023.

In Step S024, ECM 114 determines whether or not at least one of the feedback control diagnosis performed by ECM 114 and the diagnostic result on the side of VEL controller 113 indicates the abnormality.

When at least one of the feedback control diagnosis performed by ECM 114 and the diagnostic result on the side of VEL controller 113 indicates the abnormality, the routine goes to Step S025. In Step S025, the output from ECM 114 to AND circuit 321 is set at OFF (low level) which is of the abnormal determination signal to turn off relay circuit 306, thereby stopping the electric power supplied to motor drive circuit 305.

As described above, the turn-off of relay circuit 306 can stop the electric power supplied to motor drive circuit 305 to stop the drive of motor 121 when ECM 114 diagnoses that the abnormal feedback control is generated, and the turn-off of relay circuit 306 can turn off relay circuit 306 to stop the electric power supplied to motor drive circuit 305 when the abnormality of angle sensor 127 is found by the diagnosis on the side of VEL controller 113 although the feedback control is normal.

Accordingly, even if the input to AND circuit 321 cannot be set at the low level because the output circuit connected to AND circuit 321 breaks down on the side of VEL controller 113, the output to AND circuit 321 can be set at the low level on the side of ECM 114 to cut off the electric power supplied to motor drive circuit 305.

When ECM 114 diagnoses that the feedback control is normal while the diagnostic result is abnormal on the side of VEL controller 113, the output to AND circuit 321 is not directly set at OFF (low level), the abnormal diagnostic result on the side of VEL controller 113 is continued for a predetermined time or more, after that, the output to AND circuit 321 can be set at OFF (low level).

Thus, when the OFF control of relay circuit 306 is delayed, the mistaken turn-off of relay circuit 306 due to the temporary abnormality in the communication can be prevented to enhance the reliability of the fail-safe control.

The predetermined time which is of the delay time is previously adapted as a time enough to be able to confirm that the abnormality in the communication is not generated.

In the case where the information indicating normal or abnormal cannot be received from the side of VEL controller 113, or in the case where the signal of itself indicating normal or abnormal is abnormal, preferably, the abnormal determination is made to set the output to AND circuit 321 at the low level, which allows relay circuit 306 to be turned off even if the abnormality is generated in the communication.

In the case where the signal indicating the diagnostic result sent from the side of VEL controller 113 is not regular, it can be estimated that CPU 302 of VEL controller 113 is abnormal. Therefore, the output to AND circuit 321 is also set at the low level.

On the other hand, when both the feedback control diagnosis performed by ECM 114 and the diagnostic result on the side of VEL controller 113 are normal in Step S024, the routine goes to Step S026. In Step S026, the output to AND circuit 321 is set at ON (high level) to turn on relay circuit 306, thereby supplying the electric power to drive circuit 305.

At this point, when the output to AND circuit 321 is also set at ON (high level) on the side of VEL controller 113, relay circuit 306 is turned on to supply the electric power to drive circuit 305, so that the drive control of motor 121 can usually be performed.

A plurality of combinations of the relays which turn on and off the electric actuators and the drive power supplies of the electric actuators may be provided. In such cases, not only the electric power supplies are able to uniformly be turned on and off, but also only the electric power supply connected to the corresponding electric actuator is able to be cut off based on the abnormal determination object.

In the first embodiment, CPU 302 of VEL controller 113 and CPU 114a of ECM 114 directly output the high and low binary signals to AND circuit 321, thereby switching the output to AND circuit 321. In a second embodiment of the invention, as shown in FIG. 18, VEL controller 113 provided with two logic ICs 323a and 323b is able to be configured such that the output are fed into logic ICs 323a and 323b from CPUs 114a and 302 while the outputs of logic ICs 323a and 323b are fed into AND circuit 321.

Figure 18:
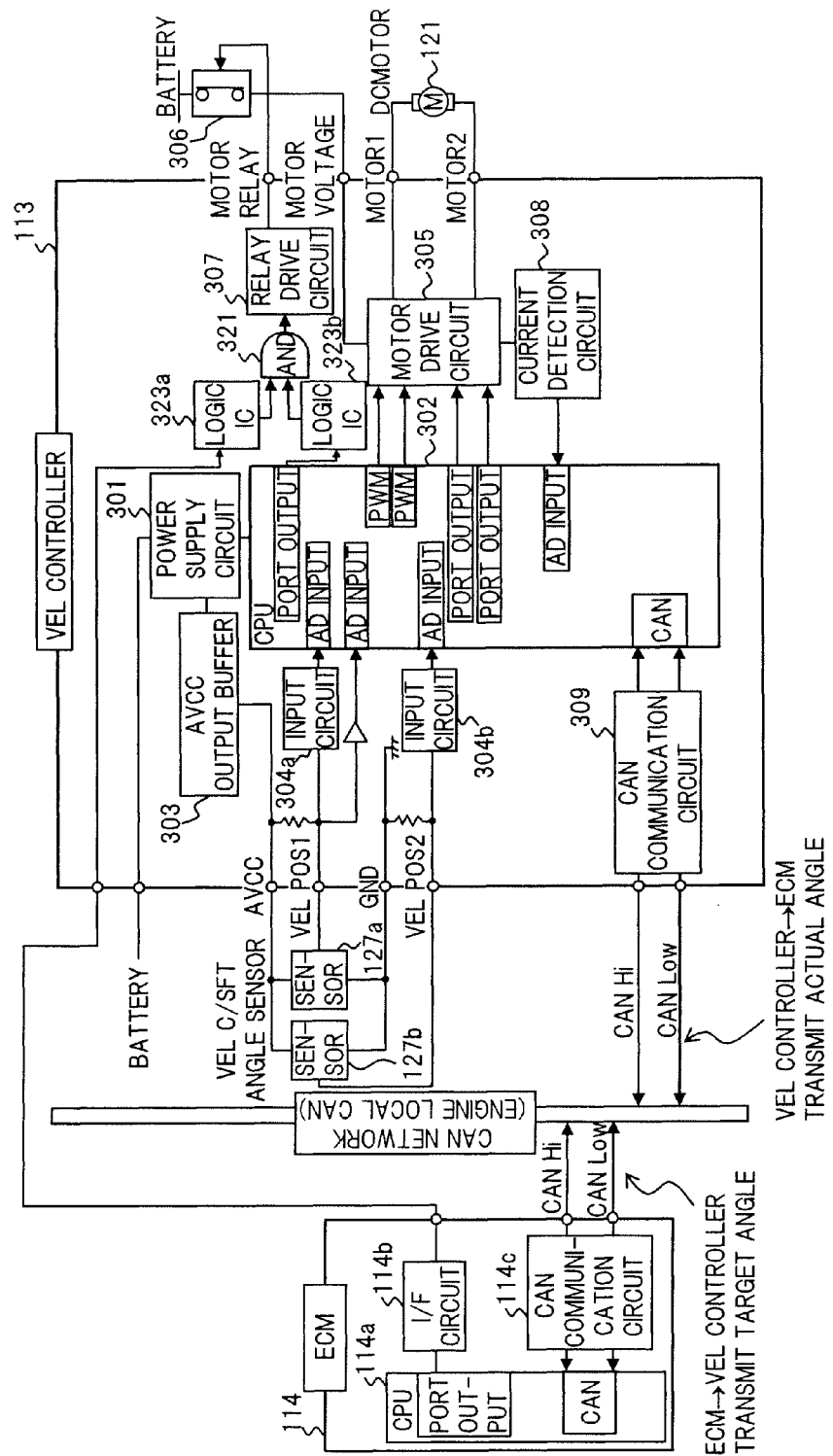
FIG. 18 is a circuit block diagram illustrating a VEL controller and a control system including ECM according to a second embodiment of the present invention.

In the configuration of FIG. 18, CPUs 114a and 302 output signals having different frequencies according to the diagnostic result (presence or absence of abnormality) to logic ICs 323a and 323b, and logic ICs 323a and 323b switch high and low levels of the output to AND circuit 321 on the basis of the frequency detection result.

Logic ICs 323a and 323b set the output thereof at the high level when the frequencies from CPUs 114a and 302 fall within a frequency range corresponding to the normal determination. Logic ICs 323a and 323b set the output thereof at the low level when the frequencies from CPUs 114a and 302 do not fall within a frequency range corresponding to the normal determination. When at least one of logic ICs 323a and 323b outputs the low level, relay circuit 306 is turned off to stop the electric power supplied to motor drive circuit 305.

In the case where logic ICs 323a and 323b are used, in the Steps S008 and S025, a signal having a frequency which is previously selected as a frequency indicating the normal state is output to logic ICs 323a and 323b, and, in Steps S009 and S026, a signal having a frequency different from the frequency is output.

Figure 19:
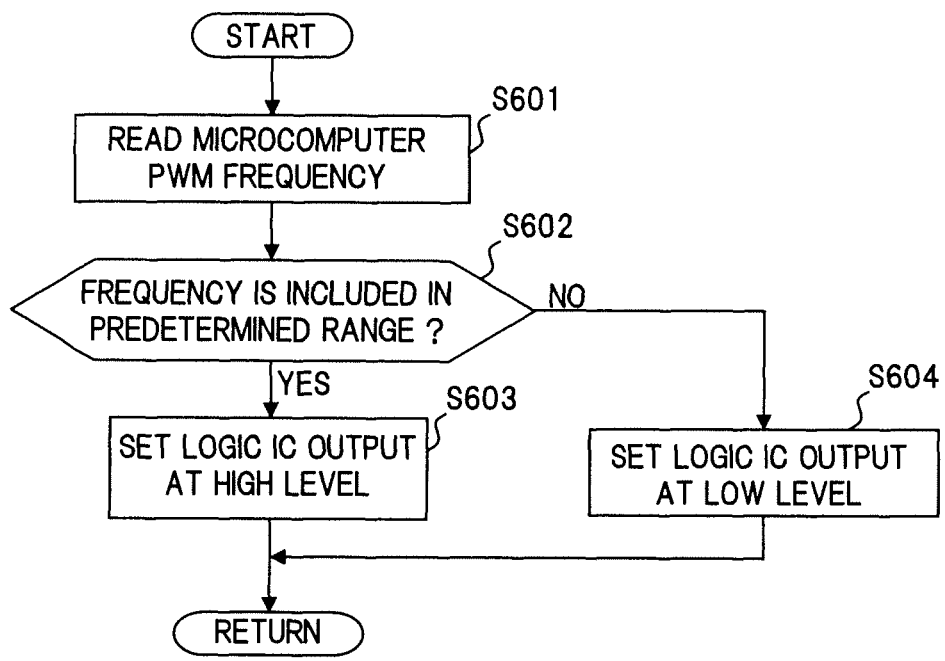
FIG. 19 is a flowchart illustrating process contents of a logic IC according to the second embodiment.

FIG. 19 is a flowchart showing process contents performed by logic ICs 323a and 323b.

In Step S601, logic ICs 323a and 323b read the frequency of the input signal supplied from CPU 114a or CPU 302.

In Step S602, logic ICs 323a and 323b determine whether or not the frequency read in Step S601 is included in a previously-set predetermined range.

In consideration of various variation factors, the predetermined range is set with a central focus on the frequency of the signal supplied from each of CPU 114a and CPU 302 in the normal diagnostic result.

When the frequency of the signal supplied from CPU 114a or CPU 302 falls within the predetermined range, the routine goes to Step S603, and logic ICs 323a and 323b set the output at the high level. When the frequency of the signal does not fall within the predetermined range, the routine goes to Step S604, and logic ICs 323a and 323b set the output at the low level.

Accordingly, when the signals supplied from CPU 114a and CPU 302 to logic ICs 323a and 323b is abnormally fixed to the high or low level, both the output levels supplied from logic ICs 323a and 323b are set at the low level to turn off relay circuit 306, so that the fail-safe can be achieved more securely.

In the system of the second embodiment, ECM 114 computes the target angle, and ECM 114 diagnoses the abnormality of the feedback control. Alternatively, the abnormal diagnosis of the feedback control can be made by a third control unit which is provided irrespective of VEL controller 113 and ECM 114.

Figure 20:
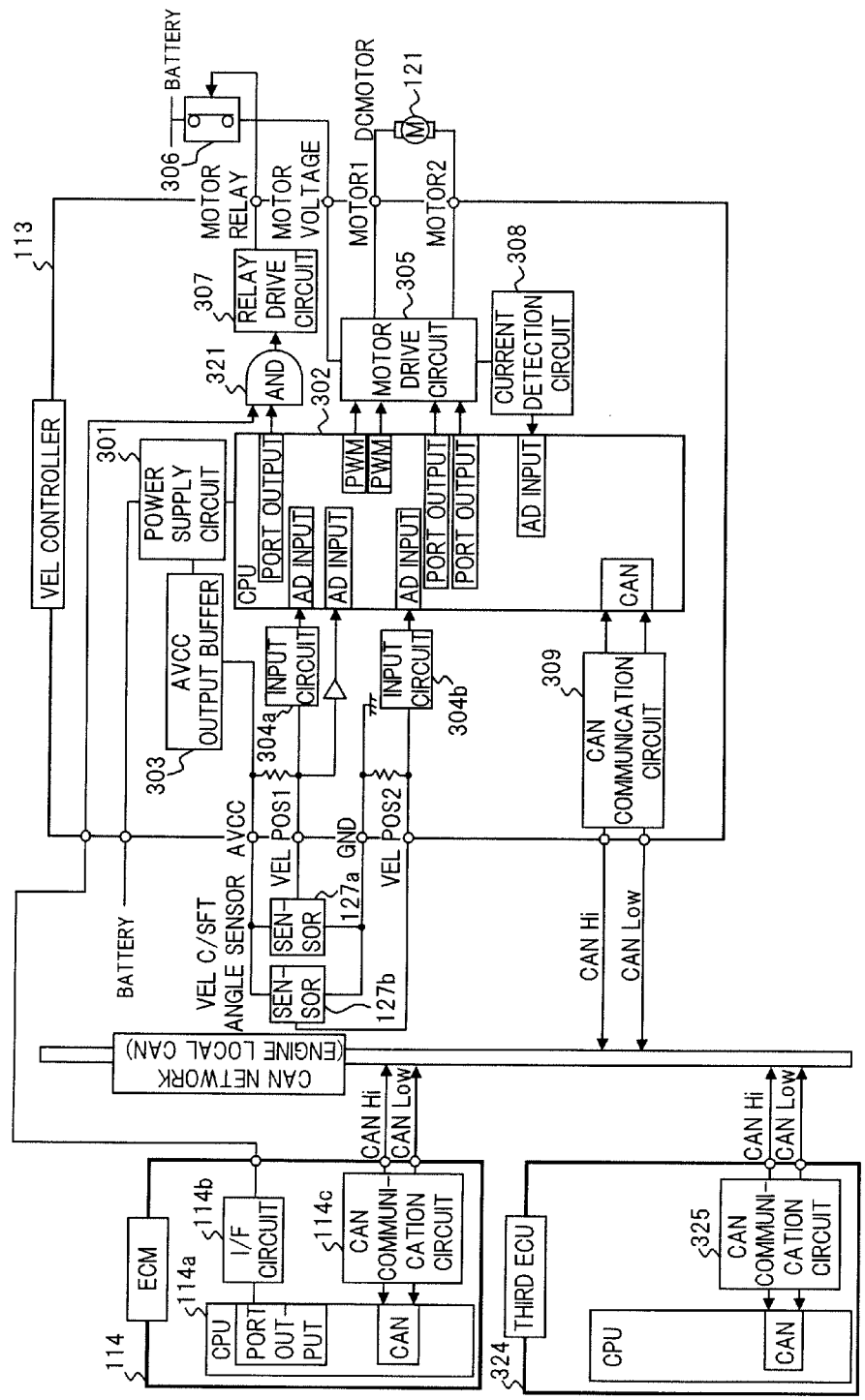
FIG. 20 is a circuit block diagram illustrating a VEL controller and a control system including ECM according to a third embodiment of the present invention.

FIG. 20 shows a system provided with a third control unit 324 according to a third embodiment of the invention. The third control unit 324 provided with a microcomputer includes a communication circuit 325 which can conduct mutual communication with VEL controller 113 and ECM 114, the target angle information is input into third control unit 324 from ECM 114, and the actual angle information of control shaft 16 is input into third control unit 324 from VEL controller 113.

The third control unit 324 sends the diagnostic result to VEL controller 113 and ECM 114, and the diagnostic result performed by VEL controller 113 is transmitted to ECM 114.

The third control unit 324 may be a unit which performs only the abnormal diagnosis of the feedback control, or third control unit 324 may be a control unit having both a function of controlling a in-vehicle device (such as automatic transmission, ABS, and four-wheel drive system) and a function of performing the abnormal diagnosis of the feedback control.

As described above, when third control unit 324 performs the abnormal diagnosis of the feedback control, a computation load on ECM 114 can be reduced while the abnormal diagnosis of the feedback control is performed even in the abnormal state of ECM 114, and the diagnostic result is transmitted to VEL controller 113. Therefore, in the abnormal state of the feedback control, relay circuit 306 can be turned off to stop the electric power supplied to motor drive circuit 305.

Figure 21:
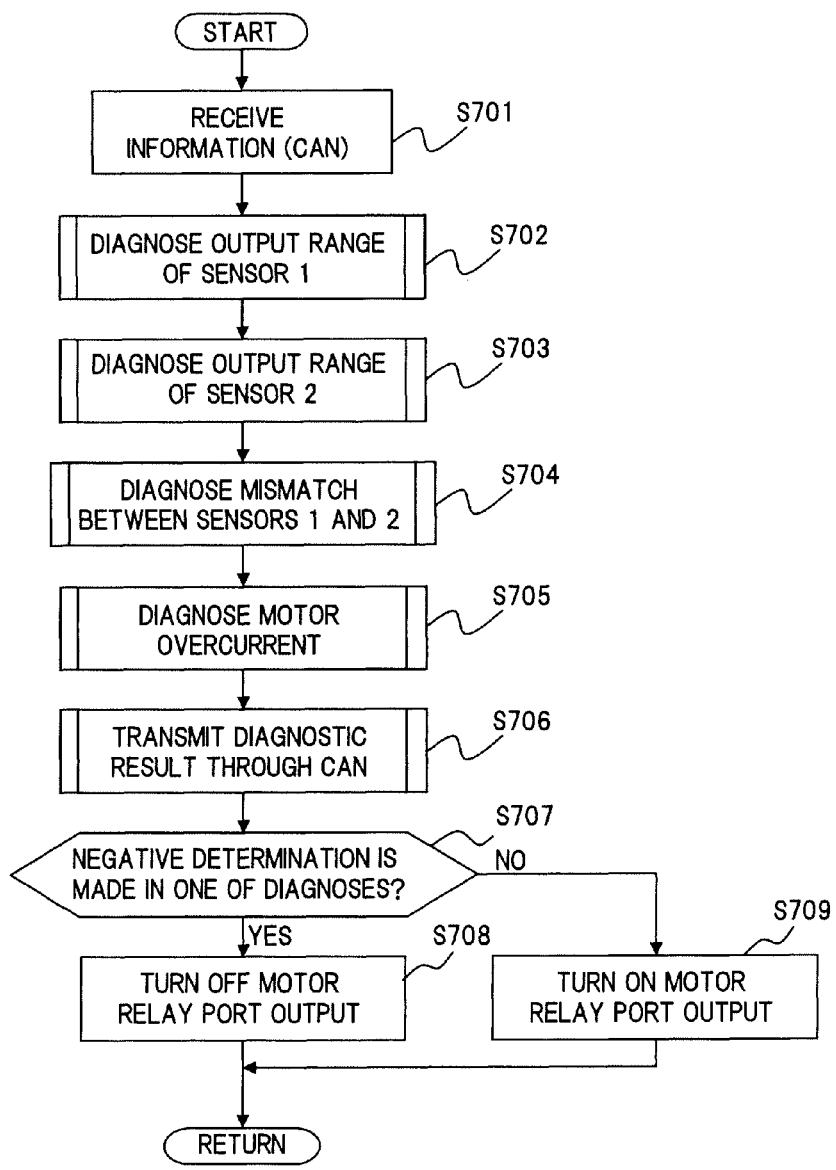
FIG. 21 is a flowchart illustrating a diagnostic process performed by the VEL controller according to the third embodiment.
Figure 22:
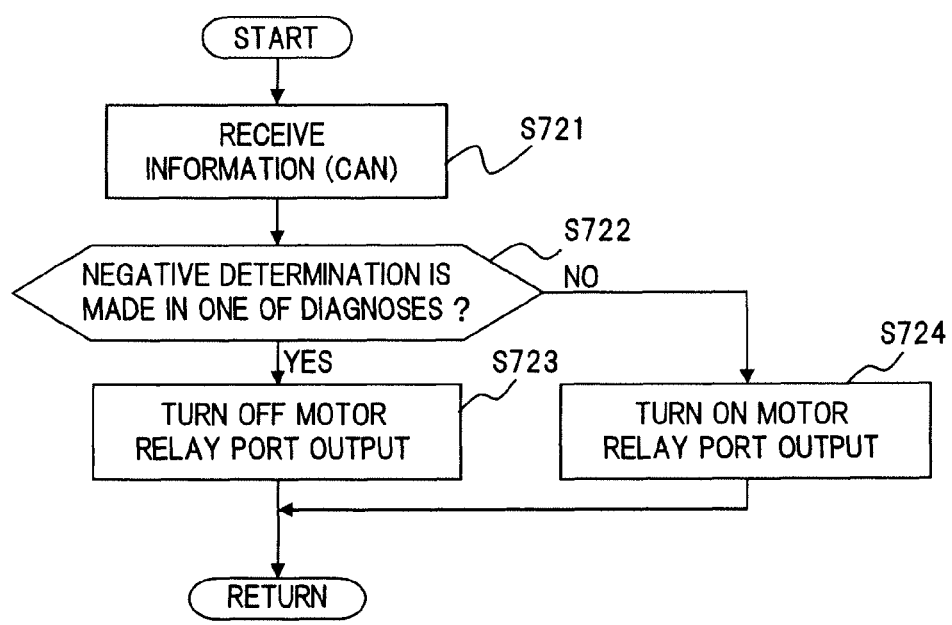
FIG. 22 is a flowchart illustrating process contents of ECM in the third embodiment.
Figure 23:
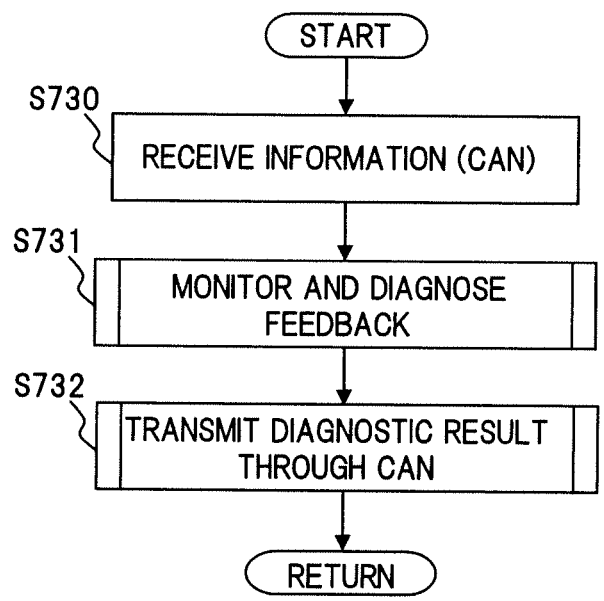
FIG. 23 is a flowchart illustrating a diagnostic process performed by a third control unit according to the third embodiment.

FIGS. 21 to 23 are flowcharts showing process contents performed by VEL controller 113, ECM 114, and third control unit 324 in the system provided with third control unit 324 of FIG. 20, respectively.

FIG. 21 is a flowchart showing a routine performed by VEL controller 113 of the third embodiment. Although the routine of FIG. 21 substantially similar to that of FIG. 12, the routine of FIG. 21 differs from the routine of FIG. 12 in process contents in Steps S701 and S707.

In Step S701, VEL controller 113 receives the diagnostic result made by third control unit 324 as will be described later.

In Steps S702 to S705, similarly to Steps S002 to S005, VEL controller 113 diagnoses the abnormality of angle sensor 127 and the existence of the motor overcurrent.

In Step S706, VEL controller 113 transmits the diagnostic results in Steps S702 to S705 to ECM 114.

In Step S707, VEL controller 113 determines whether or not the abnormal determination is made in one of Steps S702 to S705 and/or whether or not third control unit 324 diagnoses the abnormality is generated.

When the abnormal determination is made in one of Steps S702 to S705, and/or when third control unit 324 diagnoses the abnormality is generated, the routine goes to Step S708, and the output to AND circuit 321 is set at OFF (low level).

Accordingly, not only in the case where VEL controller 113 makes the abnormal diagnosis, but also in the case where third control unit 324 makes the abnormal diagnosis, relay circuit 306 is turned off to cut off the electric power supplied to motor drive circuit 305, and that motor 121 is usually driven to control the maximum valve lift amount at an abnormal value can be prevented.

When the output from VEL controller 113 to AND circuit 321 is set at OFF (low level), even if the output to AND circuit 321 is set at ON (high level) on the side of ECM 114, the output of AND circuit 321 is set at OFF (low level), and relay circuit 306 is turned off to cut off the electric power supplied to motor drive circuit 305.

Accordingly, even if one of the inputs to AND circuit 321 cannot be set at the low level because the abnormality is generated in a signal path from ECM 114 to AND circuit 321, the other input to AND circuit 321 is set at the low level on the side of VEL controller 113, so that relay circuit 306 can be turned off.

At this point, while the output to AND circuit 321 is set at OFF (low level), the signal for providing the instruction to stop the current passed through motor 121 can be output as the control signal to motor drive circuit 305.

In such cases, the current passed through motor 121 can be stopped even if the abnormality in which relay circuit 306 cannot be turned off by the output to AND circuit 321 is generated.

On the other hand, when the normal determination is made in all Steps S702 to S705, and when the normal diagnosis is made on the side of third control unit 324, the routine goes to Step S709, and the output to AND circuit 321 is set at ON (high level).

At this point, when the output to AND circuit 321 is also set at ON (high level) on the side of ECM 114, relay circuit 306 is turned on to supply the electric power to motor drive circuit 305, which allows the usual drive control of motor 121.

FIG. 22 is a flowchart showing the routine performed by ECM 114 of the third embodiment.

In Step S721, ECM 114 receives the diagnostic result information from VEL controller 113, and ECM 114 also receives the diagnostic result information from third control unit 324.

In Step S722, ECM 114 determines whether or not the abnormal determination is made by at least one of VEL controller 113 and third control unit 324.

When the abnormal determination is made by at least one of VEL controller 113 and third control unit 324, the routine goes to Step S723, the output from ECM 114 to AND circuit 321 is set at OFF (low level), and relay circuit 306 is turned off to cut off the electric power supplied to motor drive circuit 305.

When the abnormal determination is made by at least one of VEL controller 113 and third control unit 324, the output to AND circuit 321 is also set at OFF (low level) on the side of VEL controller 113. However, even if the one of the inputs to AND circuit 321 cannot be set at OFF (low level) because the abnormality is generated in the output path to AND circuit 321 of VEL controller 113, ECM 114 sets the other input of AND circuit 321 at OFF (low level) as described above. Therefore, when the one of the two input system of AND circuit 321 is normal, relay circuit 306 can be turned off to cut off the electric power supplied to motor drive circuit 305.

On the other hand, when the normal determination is made by both VEL controller 113 and third control unit 324, the routine goes to Step S724, and the output from ECM 114 to AND circuit 321 is set at ON (high level). Therefore, relay circuit 306 is turned on to supply the electric power to motor drive circuit 305.

FIG. 23 is a flowchart showing the routine performed by third control unit 324 of the third embodiment.

In Step S730, third control unit 324 receives the target angle information on control shaft 16 from ECM 114, and third control unit 324 receives the actual angle information on control shaft 16 from VEL controller 113.

In Step S731, third control unit 324 makes the abnormal diagnosis of the feedback control according to the flowchart of FIG. 17.

In Step S732, third control unit 324 transmits the diagnostic result of the feedback control to both VEL controller 113 and ECM 114.

In the third embodiment, the electric power supplied to drive circuit 305 is cut off in the abnormal use control state of the drive control of motor 121 (electric actuator). In addition, VEL controller 113 and ECM 114 can be reset. A fourth embodiment of the invention will be described below. In the fourth embodiment, the reset can be performed in the system shown in FIG. 11.

Figure 24:
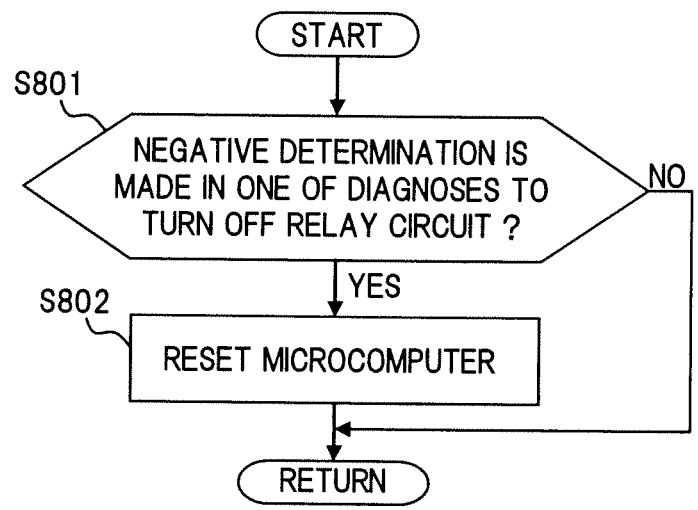
FIG. 24 is a flowchart illustrating a reset process performed by the VEL controller according to a fourth embodiment of the invention.

FIG. 24 is a flowchart showing a reset process (restart process) performed on the side of VEL controller 113 of the fourth embodiment. In Step S801, VEL controller 113 determines whether or not the abnormal determination is made by the diagnosis of VEL controller 113 of itself and/or the diagnosis on the side of ECM 114 to set the output from the VEL circuit 113 to AND circuit 321 at the low level (Off control of relay circuit 306 is performed).

When relay circuit 306 is turned off, the routine goes to Step S802, and CPU 302 of VEL controller 113 performs the reset process (microcomputer reset) by itself.

When the abnormal diagnosis is made because of a trouble with CPU 302 of VEL controller 113, possibly CPU 302 can returns to the normal state to perform the usual drive control of motor 121 (variable lift mechanism 112) by the reset process. Therefore, that motor 121 is uselessly maintained in the drive stop state can be prevented.

Not only CPU 302 of VEL controller 113 is reset by itself, but also ECM 114 can start up VEL controller 113 (CPU 302) again to perform the reset after tentatively cutting off the electric power supplied to VEL controller 113 (CPU 302) when ECM 114 controls the electric power supplied to VEL controller 113.

Further, when ECM 114 controls the reset of VEL controller 113 (CPU 302), ECM 114 can reset VEL controller 113 (CPU 302) only in the case where the determination of possible abnormality is made to VEL controller 113 (CPU 302) because the abnormality exists in the sending information from VEL controller 113 (CPU 302)

In such cases, that the normally-operated VEL controller 113 is uselessly reset can be prevented.

Figure 25:
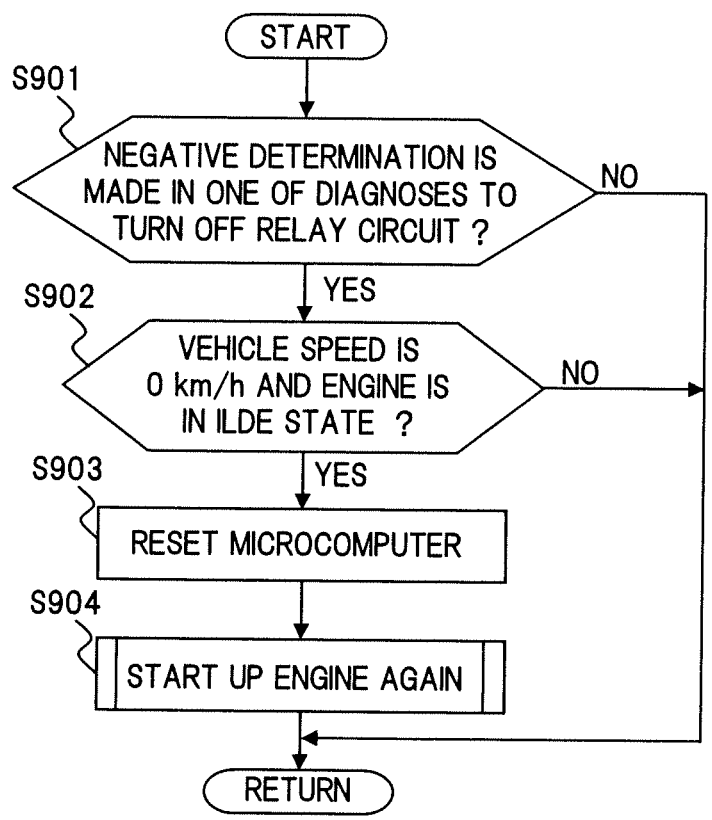
FIG. 25 is a flowchart illustrating a reset process performed by ECM according to the fourth embodiment.

FIG. 25 is a flowchart showing the reset process (restart process) performed by ECM 114 of the fourth embodiment. It is assumed that the reset process of FIG. 25 is performed by ECM 114 having a function of starting up engine 101 again.

In Step S901, ECM 114 determines whether or not the abnormal determination is made by the diagnosis of ECM 114 of itself and/or the diagnosis on the side of VEL controller 113 to set the output to AND circuit 321 at the low level (Off control of relay circuit 306 is performed).

When relay circuit 306 is turned off, the routine goes to Step S902, ECM 114 determines whether or not a vehicle speed is 0 km/h and engine 101 is in an idle state.

When the vehicle speed is 0 km/h and engine 101 is in the idle state, ECM 114 determines that no trouble arises even if engine 101 is temporarily stopped, and the routine goes to Step S903. In Step S903, CPU 114a of ECM 114 is reset by itself.

The fuel supply to engine 101 and the ignition are lost to stop engine 101 by the reset. However, when CPU 114a of ECM 114 is started after the reset, ECM 114 starts up engine 101 again.

For the method of starting up engine 101 again, in addition to the method of starting a starter motor using ECM 114, a method of starting engine 101 by performing fuel injection and ignition to the cylinder in an expansion stroke can be cited as an example in the direct-injection engine.

Particularly, when control mechanism which automatically stops and start up engine 101 again is incorporated in a vehicle which performs idle stop or a hybrid vehicle, engine 101 can be started up again after the restart.

In the case where the abnormal determination is made because of the trouble with ECM 114, possibly ECM 114 returns to the normal operation to perform the usual drive control of motor 121 (variable lift mechanism 112) by the above described reset process. Therefore, that motor 121 is uselessly maintained in the drive stop state can be prevented.

In the case where the abnormal determination is made again to turn off relay circuit 306 after engine 101 is started again, preferably the start-up of engine 101 is cancelled.

Further, in the case where ECM 114 and/or VEL controller 113 are reset, preferably the control of motor 121 is restricted. Specifically, the variable range of the maximum valve lift amount of variable lift mechanism 112 is restricted to a predetermined low-lift region, or the target maximum valve lift amount of variable lift mechanism 112 is fixed to a previously-stored reference value.

Furthermore, in the case where the determination of the normal state is made through various diagnoses performed by both ECM 114 and VEL controller 113 while the restriction is applied to the control of motor 121, the restriction can be released to return to the usual control state. That is, the state in which the restriction is applied to the control is maintained until the determination of the normal state is made after the restart.

Therefore, motor 121 (variable lift mechanism 112) can be usually operated as much as possible while the abnormal control of motor 121 is prevented.

In the above embodiments, motor 121 of variable lift mechanism 112 is cited as an example of the electric actuator. However, obviously the electric actuator is not limited to motor 121.

The relay drive circuit 307 and AND circuit 321 may be provided outside VEL controller 113 or ECM 114.

In the case where relay circuit 306 is turned off to stop the drive of motor 121, preferably, a driver is warned of the transition to the fail-safe state (abnormal use control state) using a lamp or the like.

The entire contents of Japanese Patent Application No. 2007-258124 filed on Oct. 1, 2007, a priority of which is claimed, are incorporated herein by reference.

While only selected embodiment has been chosen to illustrate and describe the present invention, it will be apparent to those skilled in the art from this disclosure that various changes and modifications can be made herein without departing from the scope of the invention as defined in the appended claims.

We claim:

1. A drive control system of an electric actuator comprising:
   a first control unit configured to compute and output a target value in drive control electric actuator; and
   a second control unit configured to input the target value computed by the first control unit and an actual value thereto and compute a manipulated variable of the electric actuator,
   wherein:
      a diagnostic result transmit section of the first control unit is configured to diagnose existence of abnormality of a control function, as a diagnostic object, of the manipulated variable in the second control unit based on the actual value and the target value, and is configured to transmit the diagnostic result to the second control unit;
      a diagnostic result transmit section of the second control unit is configured to diagnose existence of abnormality of a sensor, as a diagnostic object, for detecting the actual value, and is configured to transmit the diagnostic result to the first control unit;
      an abnormal determination signal output section of the first control unit is configured to output an abnormal determination signal as a signal indicating a diagnostic result, when at least one of the diagnostic result of the control function of the manipulated variable in the first control unit and the diagnostic result of the sensor received from the second control unit, indicates abnormality; and
      an abnormal determination signal output section of the second control unit is configured to output an abnormal determination signal as a signal indicating a diagnostic result, when at least one of the diagnostic result of the sensor in the second control unit and the diagnostic result of the control function of the manipulated variable received from the first control unit, indicates abnormality,
   the drive control system, further comprising:
      an abnormal use control circuit configured to output a signal for transferring the drive control of the electric actuator to an abnormal use control state, to a drive circuit of the electric actuator, when the abnormal determination signal is output from at least one of the first control unit and the second control unit,
   wherein each abnormal determination signal which is to indicate a same determination result according to the diagnostic results for each diagnostic object in any one of the first control unit and the second control unit, is output from the first control unit and the second control unit, to transfer the drive control of the electric actuator to the abnormal use control state, not only in a case in which the diagnostic result is abnormal, but also in a case in which a breakdown occurs in an output circuit from the first control unit to the drive control of the electric actuator and in a case in which a breakdown occurs in an output circuit from the second control unit to the drive control of the electric actuator,
   wherein, in the abnormal use control state, the first control unit is configured to reset the second control unit only in the case where a determination of a possible abnormality is made to the second control unit because an abnormality exists in sending information from the second control unit.

2. The system according to claim 1, wherein, in the abnormal use control state, the abnormal use control circuit performs the drive control of the electric actuator on the basis of a restricted manipulated variable.

3. The system according to claim 1, wherein, in the abnormal use control state, the abnormal use control circuit stops drive of the electric actuator.

4. The system according to claim 3, wherein, in the abnormal use control state, the abnormal use control circuit stops electric power supply to a drive circuit of the electric actuator, and controls the drive circuit to stop the drive of the electric actuator in order to turn off the electric actuator.

5. The system according to claim 3, wherein the abnormal. use control circuit includes a logic operation circuit configured to perform a logic operation of an abnormal determination signal output from each of the first and second control units, switches between astute in which the drive of the electric actuator is stopped and a state in which the drive of the electric actuator is permitted according to output of the logic operation circuit based on whether or not a signal from the first and second control units to the logic operation circuit falls within a predetermined range.

6. The system according to claim 1, wherein a control unit having a function of diagnosing a control function in another control unit is included as one of the first or second control units.

7. The system according to claim 1, wherein the abnormal determination signal output section delays output of the abnormal determination signal when the abnormal determination signal is output on the basis of abnormal diagnostic result in another control unit.

8. The system according to claim 1, wherein, in the abnormal use control state, the abnormal use control circuit includes a process of restarting at least one of the first or second control units, 9. The system according to claim 8, wherein one of the first or second control units includes an engine control unit configured to control fuel supply to a vehicle engine, and
   the engine control unit is restarted when the engine is in an idle state and/or the vehicle is stopped.

10. The system according to claim 9, wherein the engine control unit has a function of starting up the vehicle engine, and, after the restart thereof is performed, the vehicle engine is started up again.

11. The system according to claim 9, wherein the engine control unit puts a restriction on the drive control of the electric actuator after the restart thereof is performed.

12. The system according to claim 11, wherein the engine control unit continues the restriction of the drive control until a normal determination is made for a function of the restarted control unit.

13. The system according to claim 1, wherein at least one of the abnormal use control circuit and a power supply circuit is included in one of the first or second control units.

14. A drive control method of an electric actuator using a plurality of control units, comprising:
- diagnosing existence of abnormality in drive control, as a diagnostic object, of the electric actuator via a first control unit of the plurality of control units;
- diagnosing existence of abnormality in drive control, as a diagnostic object, of the electric actuator via a second control unit of the plurality of control units;
- transmitting diagnostic result of the first control unit to the second control unit;
- transmitting diagnostic result of the second control unit to the first control unit;
- outputting, via the first control unit, an abnormal determination signal as a signal indicating diagnostic result from the first control unit when at least one of the diagnostic result of the first control unit and the diagnostic result received from the second control unit indicates abnormality;
- outputting, via the second control unit, an abnormal determination signal as a signal indicating diagnostic result from the second control unit when at least one of the diagnostic result received from the first control unit and the diagnostic result of the second control unit indicates abnormality; and
- outputting a signal for transferring the drive control of the electric actuator to an abnormal use control state, to a drive circuit of the electric actuator, when the abnormal determination signal is output from at least one of the first control unit or the second control unit,
- wherein each abnormal determination signal which is to indicate a same determination result according to the diagnostic results for each diagnostic object in any one of the first control unit and the second control unit, is output from the first control unit and the second control unit, to transfer the drive control of the electric actuator to the abnormal use control state, not only in a case in which the diagnostic result is abnormal, but also in a case in which a breakdown occurs in an output circuit from the first control unit to the drive control of the electric actuator and in a case in which a breakdown occurs in an output circuit from the second control unit to the drive control of the electric actuator,
- wherein, in the abnormal use control state, resetting the second control unit only in the case where a determination of possible abnormality is made to the second control unit because an abnormality exists in sending information from the second control unit.

15. The method according to claim 14, wherein the abnormal use control state includes a state in which the drive control of the electric actuator is performed on the basis of a restricted manipulated variable or a state in which drive of the electric actuator is stopped.

16. The method according to claim 14, wherein a control unit having a function of diagnosing a control function in another control unit is included as one of the plurality of control units.

17. The method according to claim 14, wherein the abnormal use control state includes a process of restarting at least one of the plurality of control units.

* * * * *